(12) United States Patent
Nakajima et al.

(10) Patent No.: US 7,633,019 B2
(45) Date of Patent: Dec. 15, 2009

(54) COMBINATION WEIGHING DEVICE, BAG-MANUFACTURING AND PACKAGING SYSTEM AND COMBINATION WEIGHING SYSTEM PROVIDED WITH THE SAME

(75) Inventors: Masayoshi Nakajima, Shiga (JP); Shuji Murata, Shiga (JP); Fumitaka Tokuda, Shiga (JP); Ken Shimizu, Shiga (JP); Takashi Kimura, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 136 days.

(21) Appl. No.: 12/064,397

(22) PCT Filed: Aug. 28, 2006

(86) PCT No.: PCT/JP2006/316873

§ 371 (c)(1),
(2), (4) Date: Feb. 21, 2008

(87) PCT Pub. No.: WO2007/034655

PCT Pub. Date: Mar. 29, 2007

(65) Prior Publication Data

US 2009/0277132 A1 Nov. 12, 2009

(30) Foreign Application Priority Data

Sep. 26, 2005 (JP) ............................ 2005-278533
Sep. 26, 2005 (JP) ............................ 2005-278534

(51) Int. Cl.
*G01G 19/387* (2006.01)
(52) U.S. Cl. .................................................. 177/25.18
(58) Field of Classification Search ................ 177/25.18
See application file for complete search history.

(56) References Cited

U.S. PATENT DOCUMENTS

| | | | | |
|---|---|---|---|---|
| 4,420,051 A * | 12/1983 | Furuta et al. | ............. | 177/25.12 |
| 4,821,820 A * | 4/1989 | Edwards et al. | ........... | 177/25.18 |
| 5,889,235 A * | 3/1999 | Kawanishi et al. | ....... | 177/25.18 |
| 6,787,712 B2 * | 9/2004 | Asai et al. | ................ | 177/25.18 |
| 7,015,399 B2 * | 3/2006 | Murata et al. | ............ | 177/25.18 |
| 7,312,408 B2 * | 12/2007 | Kawanishi et al. | ....... | 177/25.18 |
| 7,332,680 B2 * | 2/2008 | Nakajima et al. | ........ | 177/25.18 |
| 7,390,981 B2 * | 6/2008 | Nakamura et al. | ....... | 177/25.18 |

FOREIGN PATENT DOCUMENTS

JP        2003-270031 A        9/2003

\* cited by examiner

*Primary Examiner*—Randy W Gibson
(74) *Attorney, Agent, or Firm*—Global IP Counselors, LLP

(57) ABSTRACT

A combination weighing device is configured and arranged to efficiently perform processes from combination weighing to discharging. The combination weighing device includes a control unit configured to control a container arrangement mechanism so as to tilt the orientation of a container storing weighed articles selected based on the results of weighing to discharge a portion or all of the articles in the container into its adjacent container.

17 Claims, 18 Drawing Sheets

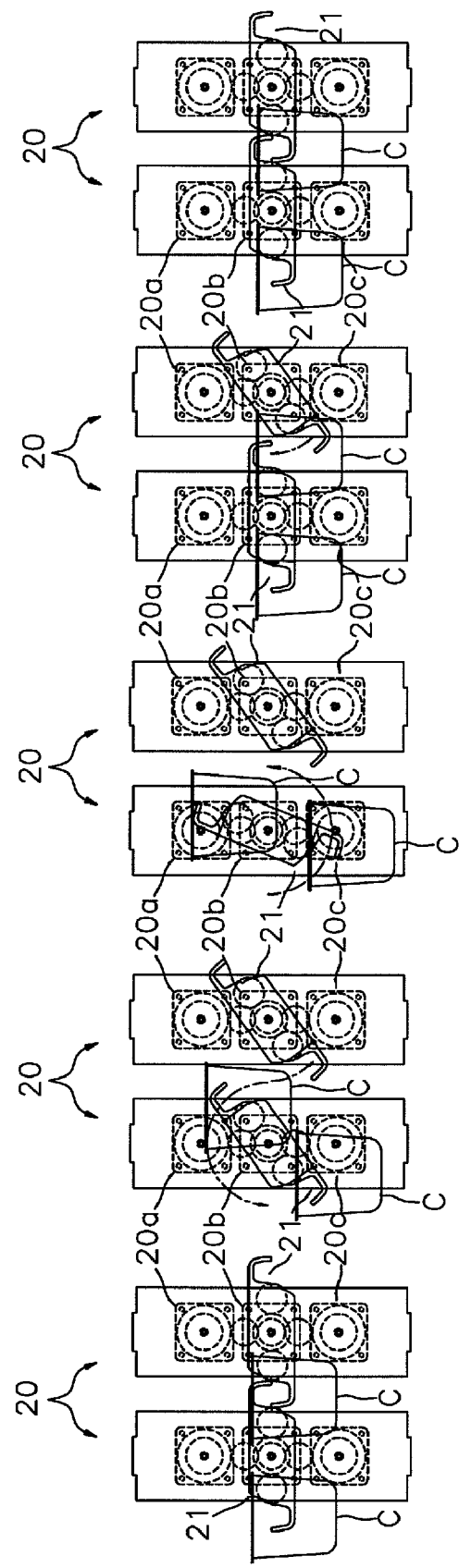

COMBINATION WEIGHING DEVICE, BAG-MANUFACTURING AND PACKAGING SYSTEM AND COMBINATION WEIGHING SYSTEM PROVIDED WITH THE SAME

CROSS-REFERENCE TO RELATED APPLICATIONS

This application claims priority to Japanese Patent Application Nos. 2005-278533 filed on Sep. 26, 2005 and 2005-278534 filed on Sep. 26, 2005. The entire disclosures of Japanese Patent Application No. 2005-278533 and 2005-278534 are hereby incorporated herein by reference.

TECHNICAL FIELD

The present invention relates to a combination weighing device, and a bag manufacturing and packaging system and a combination weighing system provided with the same, which perform combination weighing based on the results of weighing of articles stored in a plurality of containers.

BACKGROUND ART

Conventionally, a combination weighing device has been used which weighs a plurality of containers while conveying the same, selects containers that will participate in combination weighing based on the results of weighing, and discharges articles from the containers.

For example, Japanese Laid-Open Patent Application Publication No. 2003-270031 (published on Sep. 25, 2003) discloses a combination weighing device capable of improving the success rate of combination weighing by weighing articles placed in a plurality of containers that move along a circulation path formed in a vertical plane and by transferring the articles from a container which was not selected to participate in combination weighing to a different container so that the container participates in combination weighing again.

DISCLOSURE OF THE INVENTION

However, the above described combination weighing device has the following problems.

In other words, the combination weighing device disclosed in the above publication simply transfers articles to stock containers provided in the center inside the circulation path, instead of collecting articles in a certain container. Therefore, although the above combination weighing device has an advantage in that it takes less time to allow the unselected containers to participate in combination weighing again, inversion of the containers at the time of discharge still needs to be performed more than one time. Thus the processes from combination weighing to discharging are not efficient enough.

In addition, even though the articles out of the weight range suitable to participate in combination weighing are transferred to different containers, since such articles cannot participate in combination weighing, it does not lead to a reduction in the amount of articles that cannot participate in combination weighing.

Therefore, it is an object of the present invention to provide a combination weighing device capable of efficiently performing processes from combination weighing to discharging, and a bag manufacturing and a packaging system and combination weighing system provided with the same.

A combination weighing device according to a first aspect of the present invention comprises a conveying unit, a rotation mechanism, and a control unit. The conveying unit is configured to convey in the same plane a plurality of containers into which articles are fed. The rotation mechanism is configured to vertically rotate the orientation of the container and supply the articles placed therein to an adjacent predetermined container. The control unit is configured to select containers to be rotated by the rotation mechanism based on the results of weighing of the articles and control the rotation of the containers which is performed by the rotation mechanism.

Here, based on the results of weighing of the articles fed into the plurality of containers while the containers are conveyed, the control unit controls the rotation mechanism so as to collect the articles in a predetermined container.

Here, cup shaped containers each having an opening on the top may be used as the plurality of containers conveyed by the conveying unit and rotated by the rotation mechanism. In this case, vertically rotating the orientation of the containers causes the articles stored in the containers to be discharged out of the containers.

Accordingly, for example, as a container selected by the control unit based on the results of weighing is rotated by the rotation mechanism above a container conveyed alongside with the selected container, it is possible to collect the articles in a predetermined container during conveyance. Therefore, even when there is a container C storing the articles out of a predetermined weight range suitable to participate in combination weighing and thus the container C cannot participate in combination weighing, it is possible to adjust the amount of the articles stored in the container C by transferring a portion or all of the articles to a different container. As a result, the number of such containers C that cannot participate in combination weighing is reduced, creating a condition in which almost all the containers C can participate in combination weighing at all times, which consequently results in improvement of the efficiency of combination weighing.

In addition, by repeating the above described control of the rotation, the articles in a predetermined weight range to participate in combination weighing can be collected in a certain container. As a result, discharging of the articles that participated in combination weighing can be completed by discharging the articles from the certain container into a packaging machine and the like disposed downstream, which consequently improves the efficiency of the process.

Note that the results of weighing of the articles can be obtained by a weighing unit included in the combination weighing device or received from a weighing device provided separately and independently.

A combination weighing device according to a second aspect of the present invention is the combination weighing device according to the first aspect of the present invention, wherein the control unit is configured to control the rotation mechanism so as to collect the articles in one certain container among the plurality of containers.

Here, the articles in the plurality of containers selected by combination weighing are collected in one certain container.

Accordingly, after the articles that will participate in combination weighing are collected in one container, the articles can be discharged by rotating only this container. Thus it is possible to further efficiently perform the processes from combination weighing to discharging.

A combination weighing device according to a third aspect of the present invention is the combination weighing device according to the first aspect or the second aspect of the present invention, further comprising an order changing mechanism configured to change the order of the plurality of containers conveyed by the conveying unit.

Here, the order of the containers is changed when the articles are collected in a certain container by the rotation mechanism.

Accordingly, even when a container selected by combination weighing is away from the certain container in which the articles are collected, the former container can be moved into a position next to the certain container without needing to be rotated to transfer the articles contained therein. As a result, since the articles can be more efficiently collected in the certain container, it is possible to more effectively improve the efficiency of the process.

A combination weighing device according to a fourth aspect of the present invention is the combination weighing device according to any one of the first aspect to the third aspect of the present invention, wherein the conveying unit forms a circulation path which circulates the plurality of containers.

Here, the plurality of containers conveyed are circulated in the combination weighing device.

Accordingly, the processes to supply, weigh, stock and discharge the articles can be performed while a predetermined number of containers are circularly moved, allowing acceleration of these processes. Further, by circulating the containers, the number of containers to be used in the combination weighing device can be reduced.

A combination weighing device according to a fifth aspect of the present invention is the combination weighing device according to the fourth aspect of the present invention, wherein the conveying unit forms a plurality of circulation paths.

Here, a plurality of circulation paths are formed in the combination weighing device.

Accordingly, by collecting the articles in a certain container in each of the plurality of circulation paths, it is possible to further efficiently perform the processes from combination weighing to discharging.

A combination weighing device according to a sixth aspect of the present invention is the combination weighing device according to the fifth aspect of the present invention, wherein the plurality of circulation paths are configured to convey the plurality of containers at different conveying speeds.

Here, each of the plurality of circulation paths of the containers formed in the combination weighing device has a different conveying speed.

Accordingly, by juxtaposing the circulation paths that convey the containers at different conveying speeds from each other, it is possible to collect the articles in certain containers more efficiently than the case of changing the order of the containers by the order changing mechanism.

A combination weighing device according to a seventh aspect of the present invention is the combination weighing device according to the fifth aspect or the sixth aspect of the present invention, wherein the plurality of circulation paths are vertically juxtaposed.

Here, the plurality of circulation paths formed in the combination weighing device are vertically juxtaposed.

Accordingly, by rotating a container among the containers conveyed along the plurality of circulation paths at the timing when the container is positioned above a certain container in which the articles are collected, it is possible to efficiently collect the articles in the certain container. In addition, the plurality of circulation paths vertically juxtaposed may convey the containers at different conveying speeds or in opposite directions from each other, so that the articles can be more efficiently collected in the specific container.

A combination weighing device according to an eighth aspect of the present invention comprises a conveying unit, a distribution mechanism, and a control unit. The conveying unit is configured to convey the plurality of containers into which articles are fed. The distribution mechanism is configured to tilt the orientation of a predetermined container based on the results of weighing of the articles and distribute a portion or all of the articles to a different container. The control unit is configured to select a container whose orientation is to be tilted based on the results of weighing of the articles.

Here, with the combination weighing device configured to perform combination weighing based on the results of weighing of the articles stored in a plurality of containers while conveying these containers, the distribution mechanism is controlled so as to tilt the orientation of a container selected based on the results of weighing by a predetermined angle and distribute a portion or all of the articles in the container to an adjacent different container.

Specifically, the distribution mechanism is controlled such that the articles are distributed from a container that stores a large amount of articles beyond a predetermined weight range to a container between adjacent containers which stores a relatively smaller amount of articles. Alternatively, the distribution mechanism is controlled such that all of the articles are distributed from a container that stores a small amount of articles under a predetermined weight range to a container between adjacent containers which stores a relatively smaller amount of articles beyond a predetermined weight range.

Accordingly, for example, even when the result of weighing of the articles stored in each container is either beyond or under a predetermined weight range suitable to participate in combination weighing, it is possible to create a condition in which all the containers can participate in combination weighing by transferring a portion or all of the articles out of the weight range to a different container. As a result, by reducing the number of the articles that cannot participate in combination weighing and by securing a number of articles that can participate in combination weighing at all times, it is possible to efficiently perform combination weighing.

Note that the results of weighing of the articles can be obtained by a weighing unit included in the combination weighing device or received from a weighing device provided separately and independently.

A combination weighing device according to a ninth aspect of the present invention is the combination weighing device according to the eighth aspect of the present invention, wherein the control unit is configured to specify a container containing the articles whose result of weighing is out of a predetermined range and control the distribution mechanism such that the articles are distributed from this specified container.

Here, a container that cannot participate in combination weighing due to an excessive or insufficient feeding amount of the articles is specified, and a portion or all of the articles is distributed from this container to a different container. Alternatively, when there are many containers each containing an excessive amount of articles, the articles in a certain container may be discharged from the certain container, and the excessive amount of articles in other containers can be distributed to this certain container.

Accordingly, it is possible to efficiently perform combination weighing by reducing the number of articles that cannot participate in combination weighing.

A combination weighing device according to a tenth aspect of the present invention is the combination weighing device according to the eighth aspect or the ninth aspect of the present invention, further comprising an order changing mechanism configured to move the containers in a substantially vertical plane and change the order of the containers.

Here, the combination weighing device provided with the distribution mechanism configured to transfer a portion or all of the articles in a container to an adjacent different container further comprises an order changing mechanism configured to change the order of the containers.

Accordingly, for example, when the articles out of a predetermined weight range in a container are transferred to a different container that is conveyed alongside therewith, the container into which a portion or all of the articles is fed can be efficiently moved into a position adjacent to the container from which the articles are fed.

A combination weighing device according to an eleventh aspect of the present invention is the combination weighing device according to the tenth aspect of the present invention, wherein the order changing mechanism is configured to move the containers in a substantially vertical plane.

Here, the order of the containers is changed along a substantially vertical plane.

Accordingly, the orientation of the container is tilted in conjunction with the process of changing the order of the containers, and thus it is possible to change the order of the containers and transfer the articles at the same time. As a result, when there is a container that contains the articles out of a predetermined weight range, a portion or all of the articles in the container can be efficiently transferred to an adjacent different container. Thus it is possible to further improve the efficiently of the process to increase the number of the articles that can participate in combination weighing.

A combination weighing device according to a twelfth aspect of the present invention is the combination weighing device according to any one of the eighth aspect to the eleventh aspect of the present invention, wherein the conveying unit is configured to move the plurality of containers along the circulation path.

Here, the plurality of containers storing the articles that will participate in combination weighing are moved along the circulation path.

Accordingly, even when the articles stored in a container is out of a predetermined range, by transferring a portion and the like of the articles in the container to a different container as they are circulated, it is possible to efficiently perform combination weighing without reducing the number of the articles that will participate in combination weighing.

A combination weighing device according to a thirteenth aspect of the present invention is the combination weighing device according to any one of the eighth aspect to the twelfth aspect of the present invention, wherein the control unit is configured to take into account the results of weighing of the articles placed in the containers selected to distribute the articles therein and control the distribution mechanism to adjust the tilt of the containers at the time when the articles are distributed.

Here, based on the results of weighing of the articles, the control unit adjusts the amount of distribution (transfer) of the articles selected so as to be distributed.

Accordingly, it is possible to transfer a portion or the like of the articles such that the articles stored in a supply container and the articles stored in a receiving container are both in a predetermined weight range suitable to participate in combination weighing.

A combination weighing device according to a fourteenth aspect of the present invention is the combination weighing device according to any one of the eighth aspect to the thirteenth aspect of the present invention, wherein the distribution mechanism is configured to distribute the articles to be distributed to a different container by moving the articles in a substantially vertical plane.

Here, when distributing the articles from a container to a different container, the articles stored in the container are moved in a substantially vertical plane.

Accordingly, for example, by vertically inverting a container by the distribution mechanism, the articles discharged from the container can be fed into an adjacent different container by free fall or forced fall.

A bag manufacturing and packaging system according to a fifteenth aspect of the present invention comprises the combination weighing device according to any one of the first aspect to the fourteenth aspect of the present invention, a collection chute disposed below the container circulation path formed by the conveying unit and configured to collect the articles discharged from the containers, and a packaging unit configured to package the article discharged into the collection chute.

Here, after the articles are collected in a certain container by the rotation mechanism, these articles are discharged into the collection chute and packaged by the packaging unit.

Accordingly, it is possible to provide a bag manufacturing and packaging system capable of efficiently performing the processes from combination weighing and discharging to packaging.

BRIEF DESCRIPTION OF THE DRAWINGS

FIG. 4 is an enlarged front elevational view showing a state in which a container is supported by the container arrangement mechanism included in the combination weighing device of FIG. 1 and configured to change the order of the containers, distribute and discharge articles, and the like.

FIGS. 9(a) to 9(e) are front elevational views showing the flow of an operation in which the order of the containers is changed by the container arrangement mechanism shown in FIGS. 4 and 6.

DETAILED DESCRIPTION OF THE PREFERRED EMBODIMENTS

A combination weighing device provided with a conveying device according to an embodiment of the present invention is now described with reference to FIGS. 1 to 12.

Overall Structure of Combination Weighing Device 10

Figure 1:
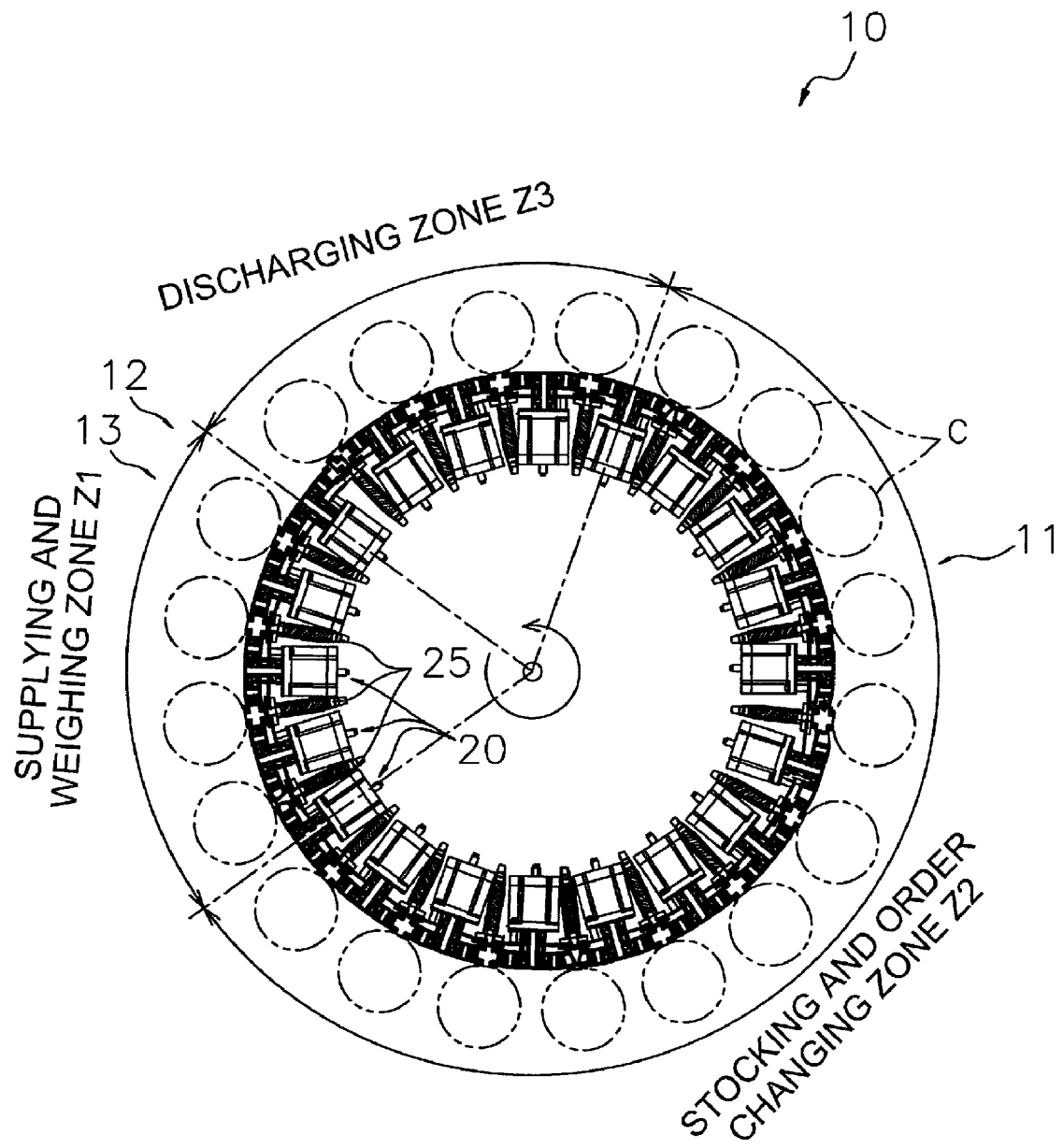
FIG. 1 is a top plan view of an overall structure of a combination weighing device provided with a conveying device according to an embodiment of the present invention.
Figure 2:
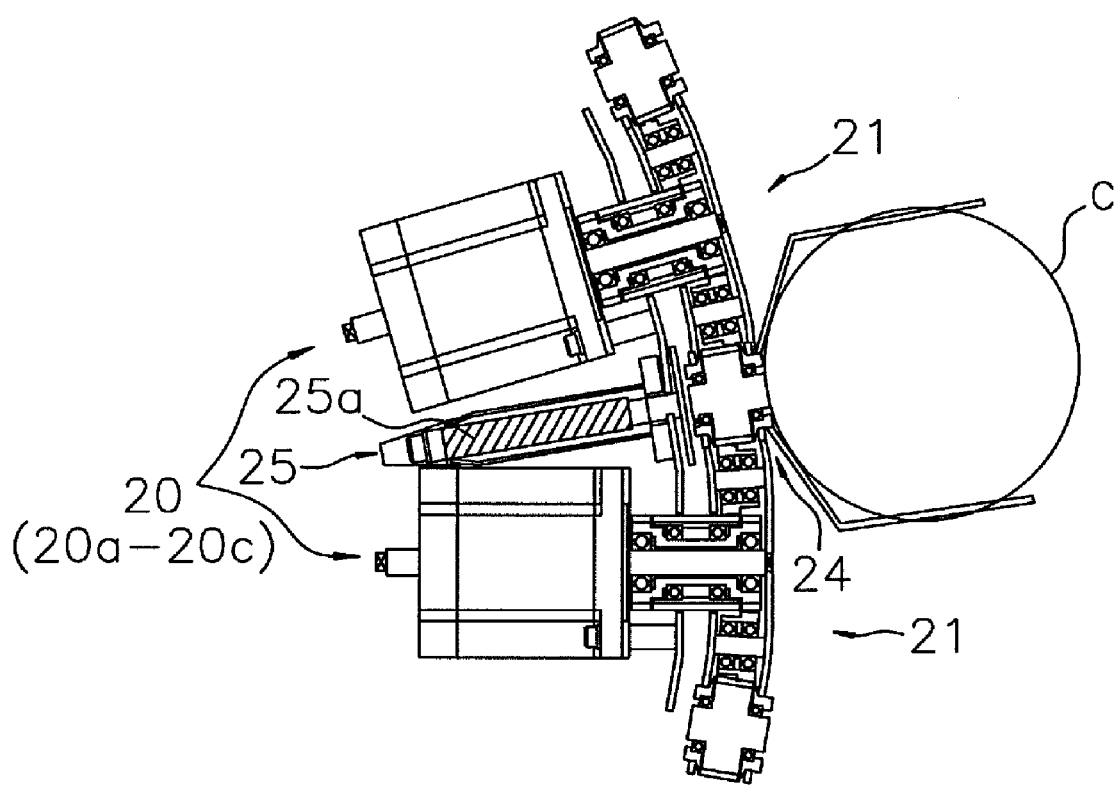
FIG. 2 is an enlarged top plan view showing a positional relationship between a weighing device and a container arrangement mechanism included in the combination weighing device of FIG. 1.

A combination weighing device 10 according to this embodiment is a combination weighing device in which, as shown in FIG. 1, while a plurality of weighing devices 25 fixedly disposed to a rotor (conveying unit) 11 are circularly moved with the containers C, containers C are weighed by each weighing device 25. The combination weighing device 10 performs combination weighing by operations of a control unit (control unit, combination computation unit) 50 (see FIG. 7) that performs combination weighing computation based on the results of weighing by each weighing device 25, selects desired containers C, and discharges articles from the containers C. In addition, the combination weighing device 10 comprises the rotor 11, a supply unit 12, a weighing unit 13, a container arrangement mechanism (order changing mechanism, rotation mechanism, distribution mechanism) 20, and the control unit 50 (see FIG. 7).

The rotor 11 is a circular plate-like member. The rotor 11 causes a rotary drive unit 23 (see FIG. 7) to circularly move the weighing unit 13, the container arrangement mechanism 20, and the like in a substantially horizontal plane with the center of the circular plate-like member as a rotation axis, thus forming a circulation path for the containers C in a substantially horizontal plane.

In a supplying and weighing zone Z1 (described later), the supply unit 12 feeds the articles to the containers C being rotated. Note that, for example, a supply device such as a conveyor and a vibration feeder can be used as the supply unit 12.

The weighing unit 13 includes the plurality of weighing devices 25 each disposed in a space between a plurality of container arrangement mechanisms 20 (described later). In the supplying and weighing zone Z1 (described later), the weighing unit 13 weighs the weight of the articles fed into the containers C by the supply unit 12. Note that the weighing devices 25 are load cells 25a (see FIGS. 2 and 3) configured to weigh the weight of the containers C placed on portions that support the containers C.

As shown in FIG. 1 and the like, the container arrangement mechanisms 20 are disposed in the space between each of the weighing devices 25 (containers C). By rotating a hook member 21 (refer to FIG. 4 and the like) in a substantially vertical plane in a stocking and order changing zone Z2 (described later), each container arrangement mechanism 20 changes the order of two mutually adjacent containers C by moving along the substantially vertical plane. In addition, in a discharging zone Z3 (described later), the container arrangement mechanism 20 vertically inverts the containers C selected based on combination weighing calculation in order to discharge the articles from the containers C. At this time, the order of the containers C containing the articles to be discharged has already been changed by the container arrangement mechanisms 20 such that the articles selected by combination weighing are collected together. Consequently, when a group of the selected containers C is moved to the discharging zone Z3, the articles selected by combination weighing can be discharged to the downstream side simply by rotating the plurality of containers C and continuously discharging the articles. Note that a specific structure of the container arrangement mechanism 20, changing the order of the containers, collecting articles in one container, and discharging the articles will be described in detail below.

Figure 7:
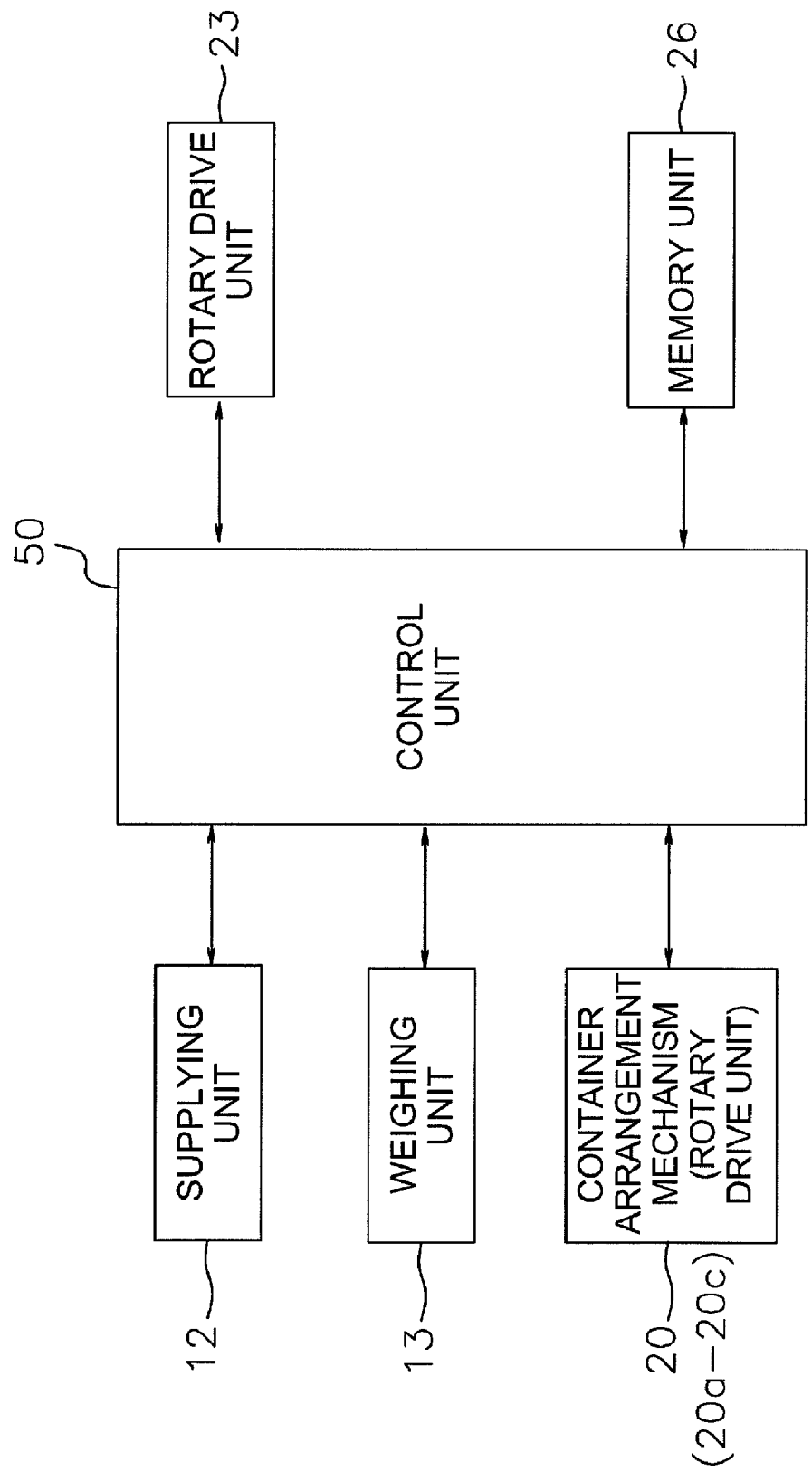
FIG. 7 is a block diagram of a control block for the combination weighing device of FIG. 1.

As shown in FIG. 7, the control unit 50 is connected to the supplying unit 12, the weighing unit 13, the container arrangement mechanism 20, the rotary drive unit 23, and a memory unit 26, and is configured to control their operations according to various programs stored in the memory unit 26. Here, the memory unit 26 stores relative positions of the containers C selected by combination weighing in the rotor 11. Therefore, while checking the positions of desired containers C stored in the memory unit 26, the control unit 50 controls the operation of desired container arrangement mechanisms 20 such that the selected containers C are collected as one group.

In addition, with the combination weighing device 10 in this embodiment, each process such as supplying the articles to the containers C, weighing the articles, changing the order of the containers C, and discharging the articles from the containers C is performed by rotating the plurality of containers C by the rotor 11. Specifically, with the combination weighing device 10, as shown in FIG. 1, the following three zones are formed: the supplying and weighing zone Z1, the stocking and order changing zone Z2, and the discharging zone Z3. More specifically, when the containers C are moved to the supplying and weighing zone Z1 in an empty state in which no articles are supplied therein, the supplying unit 12 supplies a predetermined amount of articles to the empty containers C in the supplying and weighing zone Z1, then each weighing device 25 weighs these containers C. At this time, since the weighing devices 25 have already weighed the containers C when they were empty, the weight of the articles fed into each container C can be calculated by subtracting the weight of the container C in an empty state from the weight of the container C with the articles fed therein. The control unit 50 (refer to FIG. 7) performs combination weighing calculation by using the weights of the articles calculated as described above. Next, based on the results of the combination weighing calculation performed by the control unit 50 by using the weights of a plurality of articles, the order of the containers C that are moved to the stocking and order changing zone Z2 is changed by the container arrangement mechanisms 20 such that a plurality of selected containers C are continuously juxtaposed. After the order of the containers C has already been completely changed by the container arrangement mechanisms 20 in the stocking and order changing zone Z2, these containers C are moved to the discharging zone Z3, where they are rotated by the container arrangement mechanisms 20 and the articles are discharged from the containers C in the arrangement order thereof.

As described above, the articles discharged from the containers C are supplied to a bag manufacturing and packaging machine and the like (for example, shown in FIG. 13) disposed downstream, and the articles are packaged so as to be in a predetermined weight range.

Structure of Container Arrangement Mechanism 20

Figure 4:
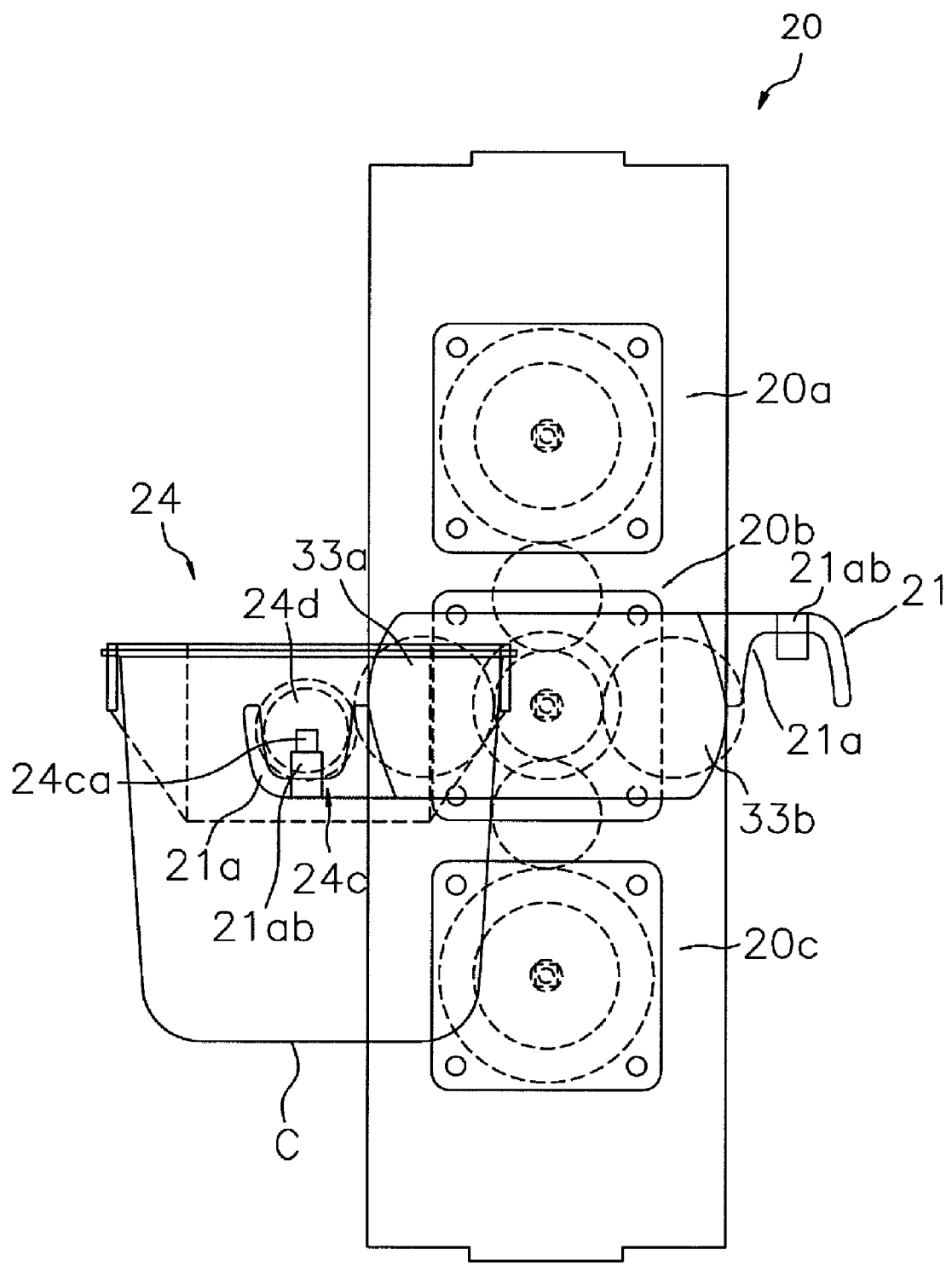
Figure 6:
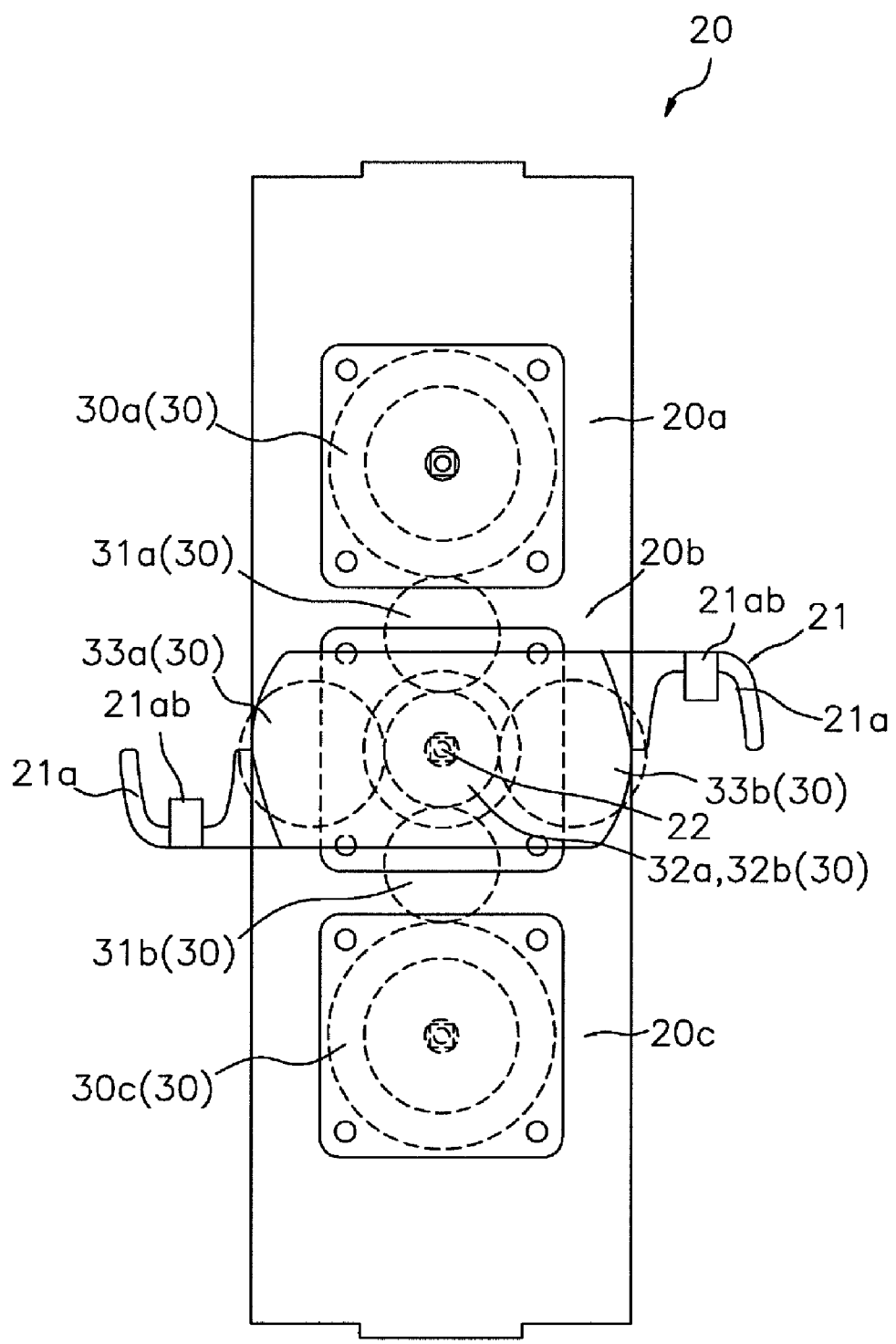
FIG. 6 is an enlarged front elevational view showing the structure of the container arrangement mechanism configured to change the order of the containers, distribute and discharge the articles, and the like in the combination weighing device of FIG. 1.

Each container arrangement mechanism 20 serves three different functions as follows: an order changing mechanism (refer to FIGS. 8 and 9) that changes the order of two containers C that are juxtaposed to each other; a distribution mechanism (refer to FIG. 10) that distributes a portion or all of the articles from the container C to its adjacent container C, and a discharging mechanism (refer to FIG. 11) that discharges the articles from the containers C. In addition, as shown in FIG. 1 and the like, the container arrangement mechanisms 20 are disposed in the space between the weighing devices 25, and are configured to circularly move together with the containers C by the rotary drive of the rotor 11. As shown in FIGS. 4 and 6, each container arrangement mechanism 20 (FIG. 2) comprises three rotary drive units 20$a$ to 20$c$ disposed in a substantially vertical direction, the hook member 21 rotatably driven by the rotary drive unit 20$b$, a rotary shaft 22 as the rotation center of the hook member 21, and a transmission mechanism 30 that transmits the rotation of the rotary shaft 22.

As shown in FIG. 6, the rotary drive unit 20$a$ rotates a gear 30$a$ to rotatably drive a gear 31$a$ that engages with the gear 30$a$, and consequently rotates a reversing gear 33$a$ via a gear 32$a$. Here, the reversing gear 33$a$ engages with a container rotary gear 24$d$ included in a support mechanism (support member) 24 as shown in FIG. 4. Consequently, the reversing gear 33$a$ is rotated, and it will thereby be possible to rotate the container C supported on the left side of the hook member 21 in FIG. 4. In other words, it is possible, by driving the rotary drive unit 20$a$, to vertically invert the orientation of the container C supported on one side of the hook member 21. It is also possible to rotate the container C by a desired angle.

As shown in FIG. 6, the rotary drive unit 20$b$ rotatably drives the rotary shaft 22 serving as the rotation center of the hook member 21 in order to rotate the hook member 21 in a substantially vertical plane about the rotary shaft 22.

As shown in FIG. 6, the rotary drive unit 20$c$ rotates a gear 30$c$ to rotatably drive a gear 31$b$ that engages with the gear 30$c$, and consequently rotates a reversing gear 33$b$ via a gear 32$b$. Here, similarly to the reversing gear 33$a$, the reversing gear 33$b$ engages with the container rotary gear 24$d$ included in the support mechanism 24 on the right side of the FIGS. 4 and 6. Consequently, by rotating the reversing gear 33$b$, it will be possible to rotate the container C supported on the right side of the hook member 21 in FIGS. 4 and 6. In other words, it is possible, by driving the rotary drive unit 20$c$, to vertically invert the orientation of the container C supported on the other side of the hook member 21. It is also possible to rotate the container C by a desired angle.

With the combination weighing device 10 in this embodiment, by adequately controlling the rotary drive of these rotary drive units 20$a$ to 20$c$, it is possible to change the order of the containers C supported at both ends of the hook member 21, distribute and discharge the articles stored in these containers C, and the like. Note that the change in the order of the containers C, rotation, and control of the rotation, which are performed by using these rotary drive units 20$a$ to 20$c$, will be described in detail below.

The hook member 21 includes circular arc portions 21$a$ formed at both ends thereof to hold the containers C and convey the same, and magnets 21$ab$ that hold the containers C at the circular arc portions 21$a$ as shown in FIGS. 4 and 6. The circular arc portions 21$a$ hold two containers C at both ends of the hook member 21 by hooking into the top and the bottom of a supported portion 24$c$ of the support mechanism 24 (FIGS. 5($a$) and 5($b$)) that supports the containers C. Each magnet 21$ab$ is attached adjacent to each circular arc portion 21$a$. The magnets 21$ab$ and magnets 24$ca$ included in the support mechanism 24 attract each other.

As shown in FIGS. 4 and 6, the rotary shaft 22 is disposed as the rotary axis of the rotary drive unit 20$b$, and is connected to the central portion of the hook member 21. The rotary shaft 22 receives the rotary driving force from the rotary drive unit 20$b$, and rotates the hook member 21 in a substantially vertical plane about the rotary shaft 22.

Structure of Transmission Mechanism 30

The transmission mechanism 30 is formed by combining a plurality of gears, and configured to transmit the rotary driving force of the rotary drive units 20$a$ and 20$c$ to the container rotary gear 24$d$ (container C) of the support mechanism 24 supported by the hook member 21. As shown in FIG. 6, the transmission mechanism 30 has the gears 30$a$ and 30$c$, the gears 31$a$ and 31$b$, the gears 32$a$ and 32$b$, and the reversing gears 33$a$ and 33$b$.

The gears 30$a$ and 30$c$ are respectively attached to the rotary shafts of the rotary drive units 20$a$ and 20$c$.

The gears 31$a$ and 31$b$ respectively engage with the gears 30$a$ and 30$c$, and transmit the rotary driving force of the rotary drive units 20$a$ and 20$c$ to the gears 32$a$ and 32$b$.

Figure 12:
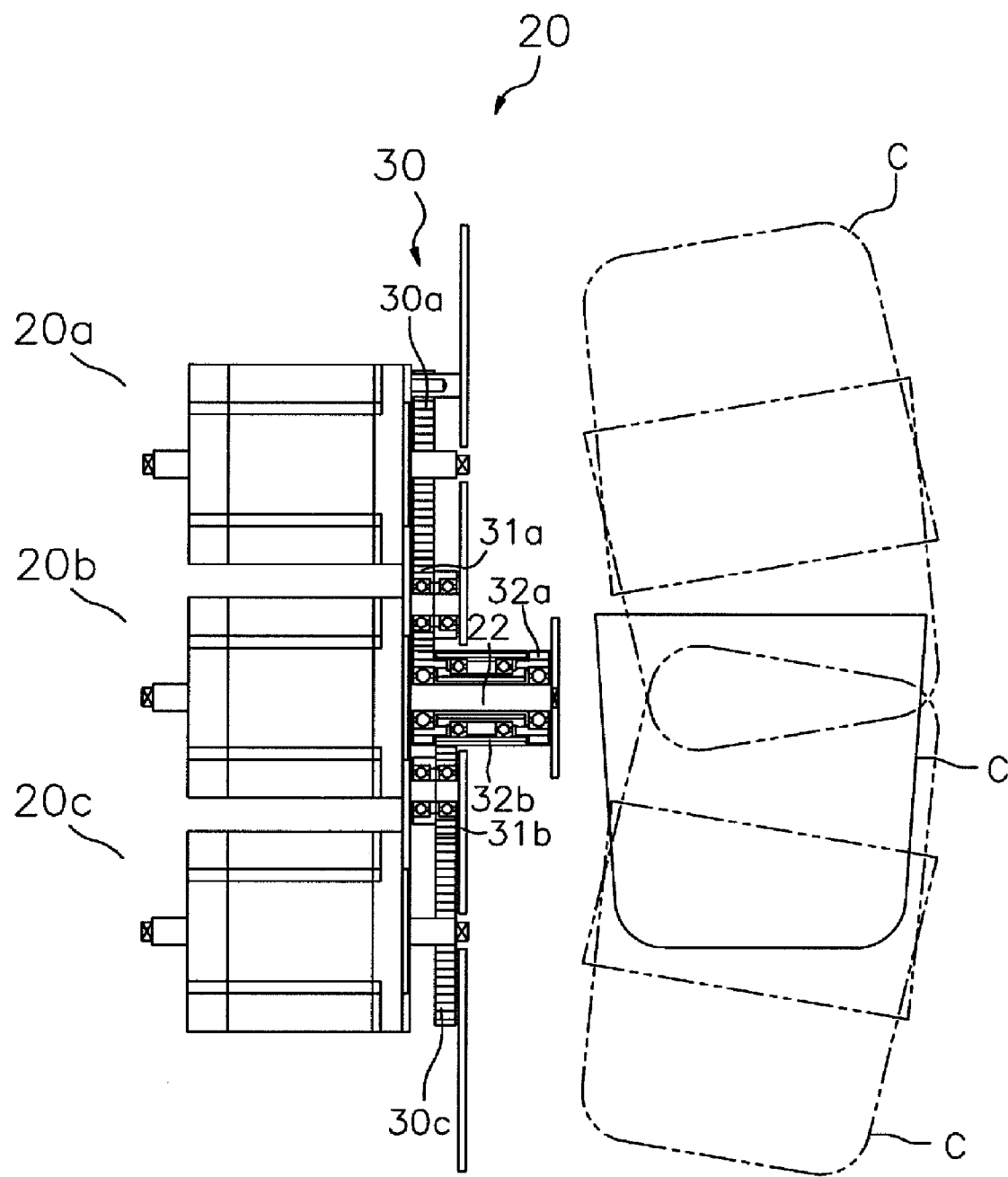
FIG. 12 is an enlarged side elevational view of a mechanism for vertically inverting the orientation of the container included in the container arrangement mechanism shown in FIGS. 4 and 6.

The gears 32$a$ and 32$b$ are rotary gears of the same size (diameter), which are concentrically disposed to be juxtaposed to each other (FIG. 12). The gears 32$a$ and 32$b$ respectively engage with the gears 31$a$ and 31$b$. The gears 32$a$ and 32$b$ transmit the rotary driving force transmitted from the gears 31$a$ and 31$b$ to the reversing gear 33$a$ on the left side of the figure and the reversing gear 33$b$ on the right side of FIG. 6, respectively.

The reversing gears 33$a$ and 33$b$ are gears that are fixedly disposed on the back side of the hook member 21. When the hook member 21 rotates, the reversing gears 33$a$ and 33$b$ rotate around the rotary shaft 22, with the gears 32$a$ and 32$b$ engaged. The reversing gear 33$a$ is configured to engage with the container rotary gear 24$d$ included in the support mechanism 24 when the support mechanism 24 becomes supported by the hook member 21 specifically at the circular arc portion 21$a$ on the left side of FIG. 6. On the other hand, the reversing gear 33$b$ is configured to engage with the container rotary gear 24$d$ included in the support mechanism 24 when the support mechanism 24 becomes supported by the hook member 21 specifically at the circular arc portion 21$a$ on the right side of FIG. 6. Accordingly, by rotating either one of the reversing gears 33$a$ or 33$b$, the support mechanism 24 supported at the circular arc portions 21a formed at both ends of the hook member 21 can be rotated together with the container C.

Structure of Support Mechanism 24

Figure 3:
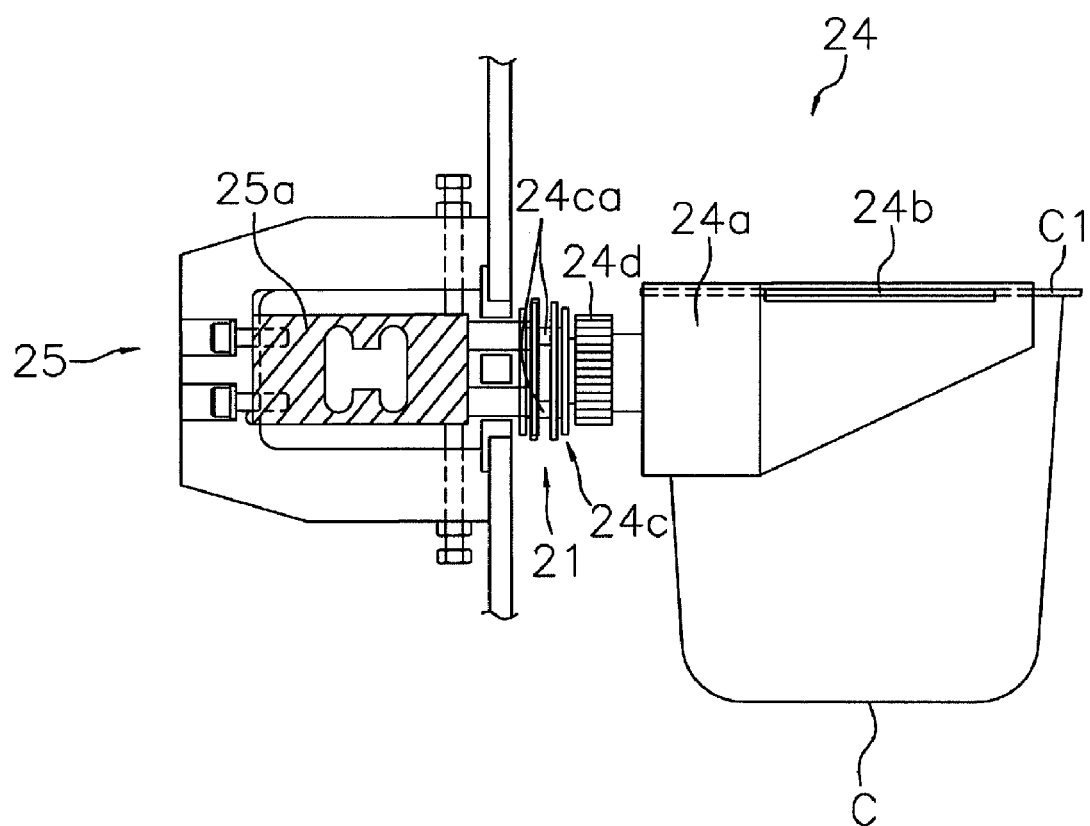
FIG. 3 is an enlarged side elevational view of a container supported by the combination weighing device of FIG. 2.

As shown in FIG. 3, the support mechanism 24 supports the container C, and is moved together with the container C over the hook member 21 by the container arrangement mechanism 20. Further, as shown in FIGS. 5(a) and 5(b), the support mechanism 24 has a container supporting portion 24a, an opening portion 24b, the supported portion 24c, and the container rotary gear 24d.

The container supporting portion 24a is a squared U-shaped sheet metal member, and is disposed along the sides of the container C.

Figure 5A:
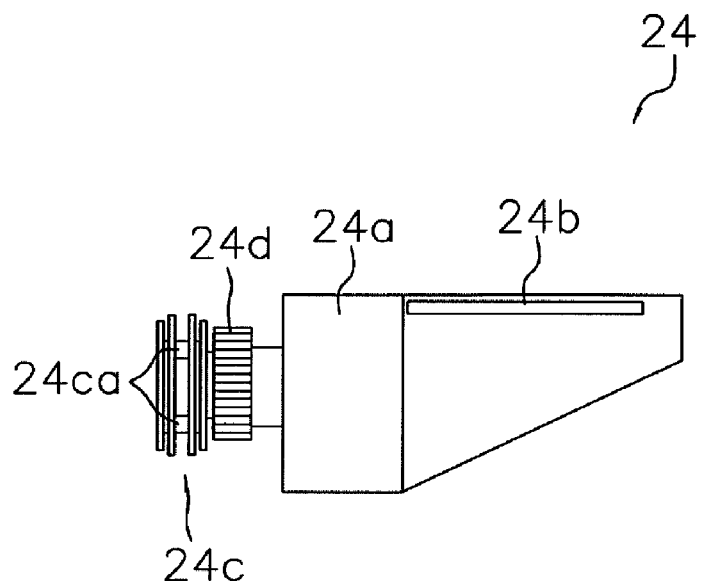
FIGS. 5(a) and 5(b) are respectively an enlarged side elevational view and an enlarged front elevational view showing the structure of the support mechanism that is moved along with the containers by the container arrangement mechanism of FIG. 3.
Figure 5B:
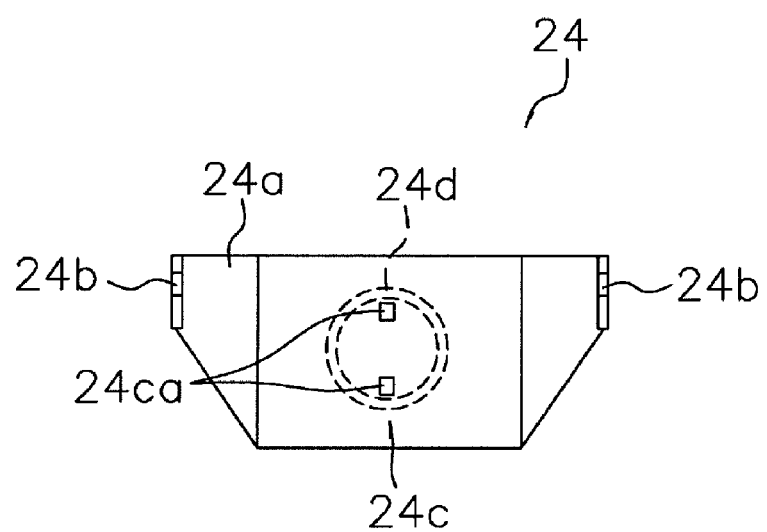

As shown in FIGS. 3, 5(a), and 5(b), the opening portion 24b is formed on both sides of the container supporting portion 24a, that is a squared U-shaped sheet metal member. The container C is supported by the container supporting portion 24a as a result of insertion of a flange portion C1 of the container C to each opening portion 24b.

The supported portion 24c is disposed on the furthest rear end of the support mechanism 24, and as shown in FIG. 4, the supported portion 24c is supported by the circular arc portions 21a of the hook member 21.

The container rotary gear 24d engages with either one of the reversing gears 33a or 33b, both of which are attached to the back side of the hook member 21 when the support mechanism 24 becomes supported by the hook member 21. Accordingly, with the rotary drive by the rotary drive unit 20a or the rotary drive unit 20c, the container C can be rotated together with the support mechanism 24 around the center of the container rotary gear 24d, with the container C supported at the circular arc portions 21a of the hook member 21.

Operation in which Order of Containers C is Changed

Here, how the container arrangement mechanism 20 and the containers C in the combination weighing device 10 in this embodiment are moved when the order of the containers C selected by the control unit 50 is changed into a desired order will be described with reference to FIGS. 8(a) to 8(e) and FIGS. 9(a) to 9(e).

First, in the supplying and weighing zone Z1, the control unit 50 obtains from each weighing device 25 the weight of the articles in the container C weighed by each weighing device 25, and then performs combination weighing calculation. Then, when the weight data are completely obtained, in the stocking and order changing zone Z2, the container arrangement mechanisms 20 are controlled such that the containers C are arranged in the desired order.

Figures 8A, 8B, 8C, 8D, 8E:
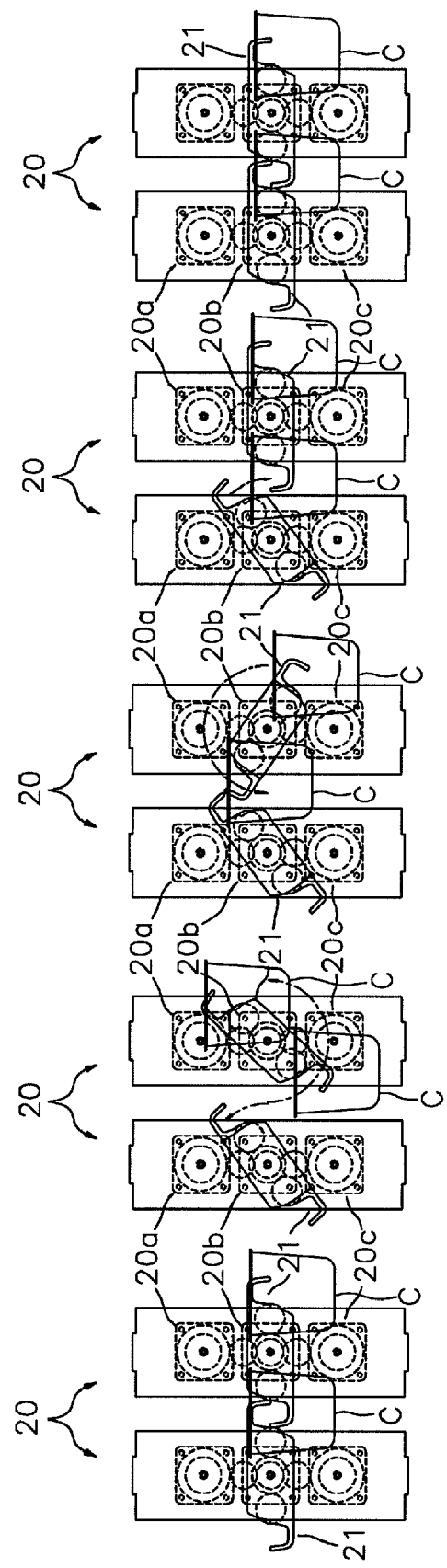
FIGS. 8(a) to 8(e) are front elevational views showing the flow of an operation in which the order of the containers is changed by the container arrangement mechanism shown in FIGS. 4 and 6.
Figures 10A, 10B, 10C, 10D:
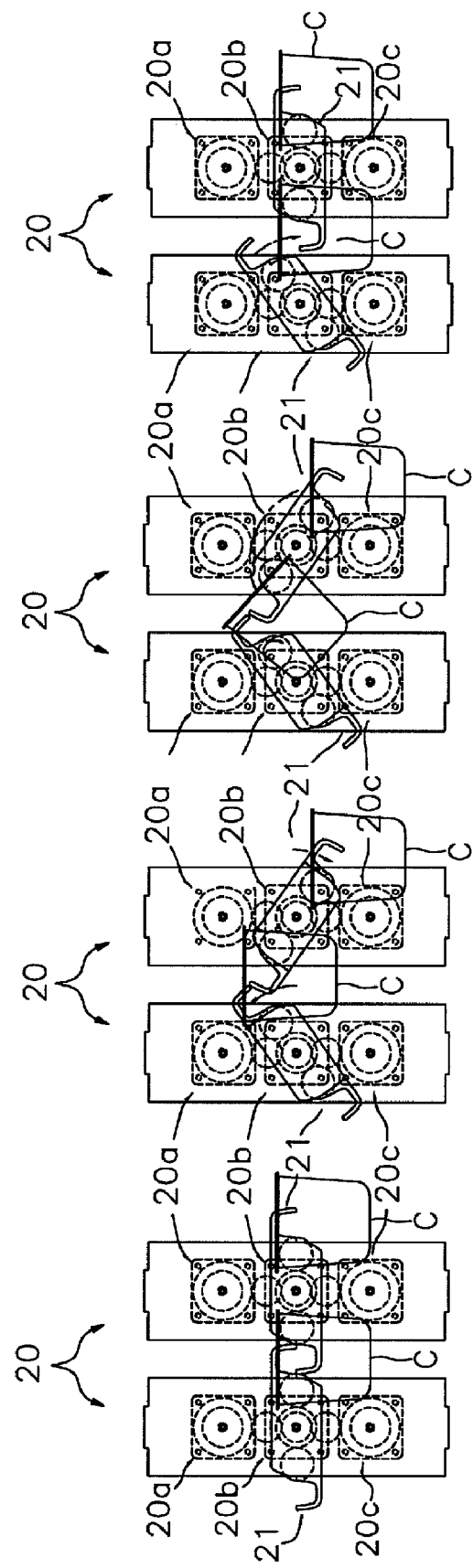
FIGS. 10(a) to 10(d) are front elevational views showing the flow of an operation in which the articles are distributed to an adjacent container by the container arrangement mechanism shown in FIGS. 4 and 6.

Specifically, as shown in FIG. 8(a), when changing the order of two containers C held at the circular arc portions 21a at both ends of the hook member 21 on the right side of the figure, the control unit 50 controls the container arrangement mechanism 20 such that the adjacent hook member 21 on the left side of the figure in an initial state at a position along a substantially horizontal direction is rotated about 45 degrees counterclockwise and stopped there, as shown in FIG. 8(b). At this time, as described above, the rotary drive of the hook member 21 is driven by the rotary drive unit 20b that drives the rotary shaft 22 that serves as the rotation center of the hook member 21.

Note that, as shown in FIG. 8(a), the container C held between the hook members 21 on the left and right sides of the figure is held by the magnets 21ab attached to the hook members 21 on both left and right sides of the figure. Here, when rotating the hook member 21, as shown in FIG. 8(b), in order to deliver the container C to the hook member 21 on the right side of the figure, the rotary drive unit 20a of the container arrangement mechanism 20 on the left side of the figure is rotated so as to rotate the reversing gear 33a clockwise to move the supported portion 24c of the support mechanism 24 that supports the container C such that the supported portion 24c is pushed out from the circular arc portions 21a. Accordingly, by forcibly releasing the container C held by the magnets 21ab, the container C can be delivered to the hook member 21 on the right side of the figure.

On the other hand, when the hook member 21 holds the containers C at its both ends whose order therebetween is to be changed, the container arrangement mechanism 20 is controlled such that the hook member 21 is rotated 180 degrees counterclockwise, as shown in FIGS. 8(b) and 8(c). Accordingly, as shown in FIG. 8(d), the order of the containers C is changed. At this time, in order to prevent the orientation of the container C from being vertically inverted during the 180 degree rotation, the control unit 50 controls the rotary drive units 20a and 20c so as to prevent the opening side of the container C from being turned sideways or downward. More specifically, as shown in FIGS. 6 and 12, the reversing gear 33a is rotated via the gears 30a, 31a, and 32a included in the above described transmission mechanism 30, and thereby the orientation of the container C held by the hook member 21 on the left side of the figure is controlled. On the other hand, the reversing gear 33b is rotated via the gears 30c, 31b, and 32b included in the transmission mechanism 30, and thus the orientation of the container C held by the hook member 21 on the right side of the figure is controlled such that the opening of the container C is prevented from being turned sideways or downward.

Lastly, the control unit 50 controls the container arrangement mechanism 20 so as to return the adjacent hook member 21 on the left side of FIGS. 8(a) to 8(e) that is stopped after being rotated 45 degrees counterclockwise to the original initial state as shown in FIG. 8(e), and thereby the operation in which the order of the containers C is changed is completed.

Note that as shown in FIG. 9(a), also when changing the order of two containers C held by the circular arc portions 21a at both ends of the hook member 21 on the left side of the figure, the container arrangement mechanism 20 is controlled such that the adjacent hook member 21 on the right side of the figure is first rotated about 45 degrees counterclockwise as shown in FIG. 9(b), then the hook member 21 on the left side of the figure is rotated about 180 degrees as shown in FIGS. 9(b) to 9(d), and finally the hook member 21 on the right side of the figure is returned to the initial orientation as shown in FIG. 9(e). By so doing, the order of the containers C can be smoothly changed, in the same way as described above.

Likewise, by changing the order of the containers C specified by the control unit 50 to discharge the articles into a certain order, it will be possible to discharge the articles in the desired discharge order when these containers C enter the discharging zone Z3.

Operation in which Articles are Distributed to Adjacent Container C

Next, how the container arrangement mechanism 20 and the containers C of the combination weighing device 10 in this embodiment are moved when the containers C selected by the control unit 50 are tilted to distribute a portion or all of the articles to their desired adjacent containers C will be described with reference to FIGS. 10(*a*) to 10(*d*).

In other words, based on the results of weighing in the supplying and weighing zone Z1, the control unit 50 selects containers C that store the articles with a weight value that is out of a predetermined weight range suitable to participate in combination weighing. Then, in the stocking and order changing zone Z2, the control unit 50 tilts the orientation of these containers C to distribute (discharge) a portion or all of the articles to their adjacent containers C. Note that the articles are considered as being out of a predetermined weight range suitable to participate in the combination weighing when, for example, the amount of articles supplied in the supplying and weighing zone Z1 is too small, or conversely, when the amount thereof is too large.

Specifically, as shown in FIG. 10(*a*), as for the two containers C held by the circular arc portions 21*a* at both ends of the hook member 21 on the right side of the figure, when the result of weighing shows that the weight of the articles stored in the container C on the left side of the figure is out of a predetermined weight range suitable to participate in combination weighing, the control unit 50 performs the following operations in order to distribute a portion or the like of the articles to its adjacent container C.

In other words, when it is recognized by the control unit 50 that the weight of the articles in the container C on the left side of the figure is out of a predetermined weight range, first, as shown in FIG. 10(*b*), the control unit 50 controls the container arrangement mechanism 20 such that the adjacent hook member 21 on the left side of the figure in an initial state at a position in a substantially horizontal direction is rotated about 45 degrees counterclockwise and stopped there. Note that, as described above, the rotary drive of the hook member 21 is driven by the rotary drive unit 20*b* that drives the rotary shaft 22 that serves as the rotation center of the hook member 21.

At this time, as shown in FIG. 10(*b*), the container C held between the hook members 21 on the left and right sides of the figure is held by the magnet 21*ab* attached to the hook members 21 on the right side of the figure.

On the other hand, the control unit 50 controls the container arrangement mechanism 20 such that the adjacent hook member 21 on the right side of the figure holding the containers C at the circular arc portions 21*a* on both left and right sides is rotated about 45 degrees clockwise and stopped there, as shown in FIG. 10(*b*). Accordingly, the supply container C from which the articles are distributed to its adjacent container C can be moved to a higher position, and also the container C into which the articles is distributed from its adjacent container C can be moved to a position lower than the supply container C so that the articles are moved substantially in a vertical plane when the articles are transferred. Note that, as described above, the rotary drive of the hook member 21 is driven by the rotary drive unit 20*b* that drives the rotary shaft 22 that serves as the rotation center of the hook member 21.

Next, as shown in FIG. 10(*b*), when the supply container C is moved to a higher position and the receiving container C is moved to a lower position, the container arrangement mechanism 20 on the right side of the figure causes the rotary drive unit 20*a* to rotate the gear 30*a* clockwise. Subsequently, the reversing gear 33*a* rotates counterclockwise via the gears 31*a* and 32*a* shown in FIGS. 6 and 12, and thereby the container reversing gear 24*c* of the support mechanism 24 that engages with the reversing gear 33*a* can be rotated clockwise. As a result, as shown in FIG. 10(*c*), the container C supported by this support mechanism 24 can be tilted to the right side. Here, since the top of the container C is open, the articles inside can be discharged to the outside of the container C by tilting the container C. Consequently, the articles can be distributed from the container C to its adjacent container C arranged in a direction to which the opening faces when the container C is tilted.

Note that the tilt of the container C when its articles are discharged to its adjacent container C is controlled with the control unit 50 by the amount of rotation of the rotary drive unit 20*a* (rotary drive unit 20*c*) so as to reduce the tilt of the container C when discharging a small amount of the articles from the container C, and so as to increase the tilt of the container C when discharging a large amount (all) of the articles from the container C. Accordingly, it is possible to adjust the amount of the articles stored in the supply container C such that the weight of the articles will be in a predetermined weight range suitable to participate in combination weighing.

As shown in FIG. 10(*d*), after the container C that was tilted for discharging is returned to the original state, the control unit 50 returns the hook member 21 on the right side to the initial position, and then the control unit 50 controls the container arrangement mechanism 20 so as to return the hook member 21 on the left side to the initial state.

After this, the article supply container C and the article receiving container C again proceed to the supplying and weighing zone Z1, where they are weighed in a state in which the articles have been distributed, without a supply of new articles.

Here, when the weights of the articles stored in the both containers C are in a predetermined weight range suitable to participate in combination weighing, these containers C are moved to the stocking and order changing zone Z2 without any change. In this zone, the order of the containers C whose articles therein will participate in combination weighing is changed, and then the articles are subsequently discharged in the discharging zone Z3.

On the other hand, when the results of weighing of the containers C after the articles are distributed show that the weight of either one or both of the containers C are out of the above described predetermined weight range, the control unit 50 again controls the container arrangement mechanism 20 and distributes the articles between the two containers C.

With the combination weighing device 10 in this embodiment, as described above, by performing an operation once or repeatedly in which the articles out of a predetermined weight range suitable to participate in combination weighing are distributed to another container C, the number of the containers C that cannot participate in combination weighing is reduced, and thereby it will be possible to efficiently perform combination weighing.

Note that the above-described operation in which the articles are distributed may be performed such that the containers C that store each type of the articles selected by combination weighing are arranged to be adjacent to each other, and then the articles subsequently stored in these containers C are collected in the certain container C.

In this case, the articles that will participate in combination weighing can be completely discharged by a single discharging operation, i.e., by vertically inverting one container C, so that the discharging operation can be efficiently performed, compared to the case where the articles are discharged from a plurality of containers C.

Operation in which Articles are Discharged from Container C

Next, how the container arrangement mechanism 20 and the containers C in the combination weighing device 10 in this embodiment are moved when the containers C selected by the control unit 50 are vertically inverted and the articles are discharged at a desired position will be described with reference to FIGS. 11(a) to 11(e).

In other words, based on the results of weighing in the supplying and weighing zone Z1, the control unit 50 changes the order of the containers C in the desired order in the stocking and order changing zone Z2, and then the articles are subsequently discharged from the containers C in the discharging zone Z3.

Figures 11A, 11B, 11C, 11D, 11E:
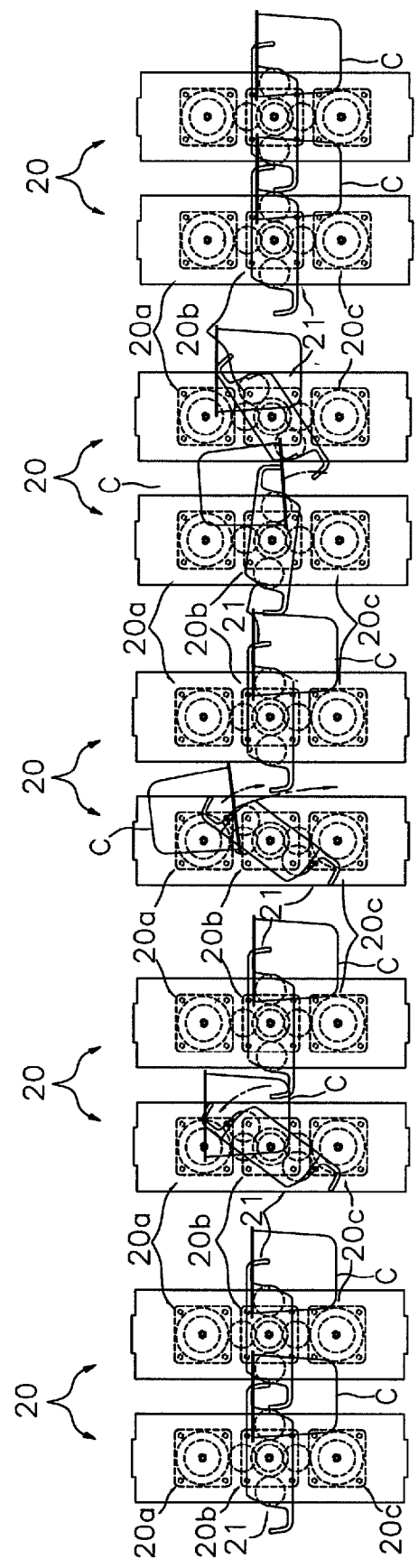
FIGS. 11(a) to 11(e) are front elevational views showing the flow of an operation in which the articles are discharged from the container by the container arrangement mechanism shown in FIGS. 4 and 6.

Specifically, as shown in FIG. 11(a), between the two containers C held by the circular arc portions 21a at both ends of the hook member 21 on the right side of the figure, when the container C on the left side of the figure stores articles selected to participate in combination weighing, the control unit 50 discharges the articles from the container C on the left side of the figure in the discharging zone Z3.

In other words, first, as shown in FIG. 11(b), the container arrangement mechanism 20 is controlled such that the adjacent hook member 21 on the left side of the figure in an initial state at a position in a substantially horizontal direction is rotated about 60 degrees counterclockwise and stopped there while the circular arc portion 21a on the right side of the figure keeps holding the container C. Note that, as described above, the rotary drive of the hook member 21 is driven by the rotary drive unit 20b that drives the rotary shaft 22 that is the rotation center of the hook member 21.

Note that at this time, as shown in FIG. 11(a), the container C held between the hook members 21 on the left and right sides of the figure is held by the magnets 21ab attached to the hook members 21 on the both left and right sides on the figure. Accordingly, as in the case described above, when rotating the hook member 21, in order to deliver the container C to the hook member 21 on the left side of the figure as shown in FIG. 11(b), the rotary drive unit 20a of the container arrangement mechanism 20 on the right side of the figure is rotated so as to rotate the reversing gear 33a clockwise and to move the supported portion 24c of the support mechanism 24 that supports the container C such that the supported portion 24c is pushed out from the circular arc portions 21a. Accordingly, by forcibly releasing the container C held by the magnets 21ab, the container C can be delivered to the hook member 21 on the left side of the figure.

Next, as shown in FIG. 11(b), when the supply container C is moved to a position higher than the initial position, the container arrangement mechanism 20 on the left side of the figure causes the rotary drive unit 20c to rotate the gear 30c shown in FIGS. 6 and 12 clockwise. Subsequently, the reversing gear 33b is rotated counterclockwise via the gears 31a and 32a, and thus it will be possible to rotate the container reversing gear 24d of the support mechanism 24 that engages with the reversing gear 33b clockwise. As a result, as shown in FIG. 11(c), the container C supported by this support mechanism 24 can be vertically inverted such that its opening faces downward. Accordingly, it is possible to discharge the articles into a collection chute and the like (for example, shown in FIG. 13) disposed below the containers C. In addition, at the time of discharging shown in FIG. 11(c), the control unit 50 controls the container arrangement mechanism 20 so as to vertically invert the container C and rotate the hook member 21 clockwise. Accordingly, a vertically downward force can be added to the articles that drop downward by the force of gravity when the container C rotates, so that tailing, which easily occurs when the articles comprise a plurality of article types, can be prevented from occurring.

Note that the vertical inversion of the container C at the time of discharging of the articles to its adjacent container C is controlled with the control unit 50 by the amount of rotation of the rotary drive unit 20c (rotary drive unit 20a) such that the container C rotates through a range from 150 degrees to 180 degrees. Accordingly, the articles stored in the container C can be reliably discharged to the outside.

As shown in FIG. 11(d), after the container C that was tilted for discharging is returned to the original state, the control unit 50 controls the container arrangement mechanism 20 so as to return both of the hook members 21 on the left and right sides to the initial position as shown in FIG. 11(e).

With the combination weighing device 10 in this embodiment, as described above, the container C is vertically inverted at the timing when a container C circularly moving in a substantially horizontal plane is moved to a predetermined position, and thus the articles stored in the container C can be discharged to a desired location. As described above, in this embodiment, based on the results of combination weighing, the order of the containers C is changed so that the articles therein can participate in combination weighing. Therefore, it is possible to continuously discharge desired articles to a predetermined location.

Characteristics of Combination Weighing Device 10

(1) With the combination weighing device 10 of this embodiment, as shown in FIGS. 11(a) to 11(e), the control unit 50 controls the container arrangement mechanism 20 so as to vertically invert the orientation of the container C storing the weighed articles selected based on the results of combination weighing such that the opening portion of the container C faces downward so as to discharge all of the articles from the container C to a predetermined discharge location.

Accordingly, it is possible to easily discharge the articles simply by weighing a plurality of containers while conveying a plurality of containers C and vertically inverting a container C selected based on the results of combination weighing such that the opening thereof faces downward. In addition, by repeating the rotary movement as shown in FIGS. 11(a) to 11(e), it is possible to continuously discharge the articles selected by combination weighing.

(2) With the combination weighing device 10 of this embodiment, the control unit 50 controls the container arrangement mechanism 20 such that the articles are collected in a certain container C from each of a plurality of containers C storing the articles selected based on the results of combination weighing.

Accordingly, since all of the articles that participated in combination weighing can be discharged by a single discharge operation in which one container C is vertically inverted, it is possible to significantly improve the efficiency of the discharge operation in combination weighing compared to the conventional operation.

(3) With the combination weighing device 10 of this embodiment, the control unit 50 controls the container arrangement mechanism 20 so as to change the order of a plurality of containers C selected by combination weighing.

Accordingly, the order of the containers C is changed such that a plurality of containers that will discharge the articles stored therein are continuously arranged in order to participate in combination weighing. This consequently improves the efficiency of the above described operations such as distribution and discharging of the articles.

(4) With the combination weighing device 10 of this embodiment, a circulation loop (circulation path) is formed by circularly moving a plurality of containers C in a substantially horizontal plane.

Accordingly, by circularly moving a predetermined number of the containers C, it is possible to perform operations such as supplying, weighing, and stocking the articles, changing the order of the containers C, and distributing and discharging the articles.

(5) With the combination weighing device 10 of this embodiment, as shown in FIGS. 10(*a*) to 10(*d*), the control unit 50 controls the container arrangement mechanism 20 so as to tilt the orientation of the container C storing the weighed articles selected based on the results of combination weighing in order to distribute (discharge) a portion or all of the articles in the container C to its adjacent container C.

Accordingly, for example, when there is a container C containing too small an amount of articles and thus the weight of the articles is not in a predetermined weight range suitable to participate in combination weighing, it is possible to transfer all of the articles to a different container C containing a relatively small amount of articles. On the other hand, for example, when there is a container containing an excessive amount of articles and thus the weight of the articles is not in a predetermined weight range suitable to participate in combination weighing, it is possible to transfer a portion of the articles to a different container C containing a relatively small amount of articles. As a result, it is possible to prevent a decrease in efficiency of combination weighing which occurs due to an increase in the number of containers C that cannot participate in combination weighing because the weight of the articles stored therein is out of a predetermined weight range suitable to participate in combination weighing.

(6) With the combination weighing device 10 of this embodiment, when the result of weighing of the articles obtained by the weighing unit 13 is out of a predetermined weight range, the control unit 50 specifies a container C storing such articles. Then, a portion or all of the articles is distributed from this specified container C to a different container C.

Accordingly, by reliably reducing the number of the containers C that cannot participate in combination weighing because the weight of the articles therein is out of a predetermined weight range suitable to participate in combination weighing, it is possible to prevent a decrease in efficiency of combination weighing.

(7) With the combination weighing device 10 of this embodiment, the control unit 50 controls the container arrangement mechanism 20 so as to change the order of a plurality of containers C selected by combination weighing.

Accordingly, the order of the containers C is changed such that a plurality of containers C that will distribute the articles stored therein to their adjacent different containers C and the like are continuously arranged in order to participate in combination weighing. This improves the efficiency of the above described operations such as distribution and discharging of the articles.

(8) With the combination weighing device 10 of this embodiment, the container arrangement mechanism 20 moves a plurality of containers C in a substantially vertical plane and changes the order of the containers C.

In this way, by moving the containers C in a substantially vertical plane, the operations such as distribution and discharging of the articles stored in the containers C having an opening on the top can be performed along with the operation in which the order of the containers C is changed. Therefore, the operations such as changing the order of the containers C, distributing and discharging the articles, and the like can be performed by using a common drive system instead of using separate drive systems.

(9) With the combination weighing device 10 of this embodiment, a circulation loop is formed which circularly moves a plurality of containers C.

Accordingly, the operations such as supplying, weighing, and stocking the articles, changing the order of the containers C, and distributing and discharging the articles can be performed while circularly moving a predetermined number of the containers C.

(10) With the combination weighing device 10 of this embodiment, the control unit 50 controls the amount of rotary drive by the rotary drive units 20*a* to 20*c* included in the container arrangement mechanism 20 such that the tilt of the containers C is adjusted based on the results of weighing by the weighing unit 13.

For example, when the result of weighing shows that the amount of the articles is too far below a predetermined weight range, it is necessary to distribute (discharge) all of the articles to a different container. Thus the rotation is controlled such that the opening is vertically inverted. On the other hand, when the result of weighing shows that the amount of the articles is too far above the predetermined weight range, it is necessary to discharge only a portion of the articles to a different container C. Thus the rotation is controlled such that the container C is tilted about 60 degrees.

In this way, by controlling the rotation of the container C based on the result of weighing by the weighing unit 13, it is possible to distribute an adequate amount of articles to a different container C.

(11) With the combination weighing device 10 of this embodiment, the articles are moved along a substantially vertical plane and distributed or discharged to a different container C adjacently disposed.

Accordingly, along with the drive by the container arrangement mechanism 20 to move the containers C in a substantially vertical direction, the articles can be distributed to different containers C.

Alternative Embodiments

While a selected embodiment of the present invention has been described hereinbefore, it will be apparent that the present invention is not limited thereto and various changes and modifications can be made herein without departing from the scope of the invention.

(A) The above embodiment was described using the combination weighing device as an example, which circularly moves the containers C along the single circulation loop formed by one combination weighing device 10. However, the present invention is not limited thereto.

For example, as shown in FIGS. 14 to 17, a combination weighing system 200 may be a structure in which a plurality of the combination weighing devices 10 (combination weighing devices 10*a* to 10*d*), each of which forms a single circulation loop as shown in FIG. 1, are vertically arranged in multiple stages to circulate a plurality of containers C, and the containers C are vertically inverted, and thus combination weighing is performed while transferring a portion or all of the articles between adjacent containers C (see the containers C shown in dotted hatching in the figures).

In this case, the articles are supplied to the container C circulating through the combination weighing device 10a from an end portion of a supply unit 203 fixed to a strut 202 mounted on a base portion 201. Further, the combination weighing device 10a supplies the articles in the container C to a different container C circulating in the combination weighing device 10b disposed on the stage below the combination weighing device 10a while a part or all of the articles are transferred between adjacent containers C within each of the combination weighing device 10a. After the above described operation is performed between the combination weighing devices 10b and 10c and between the combination weighing devices 10c and 10d, the articles that underwent combination weighing are fed to a feeding chute 204.

Note that with the combination weighing system 200 with the multistage structure of this type, as described above, a portion or all of the articles may be transferred between the adjacent containers C in the combination weighing devices 10a to 10d and between the containers C that circulate through the combination weighing devices 10a to 10d vertically arranged. Alternatively, a portion or all of the articles may be transferred only between the containers C vertically arranged.

Figure 18A:
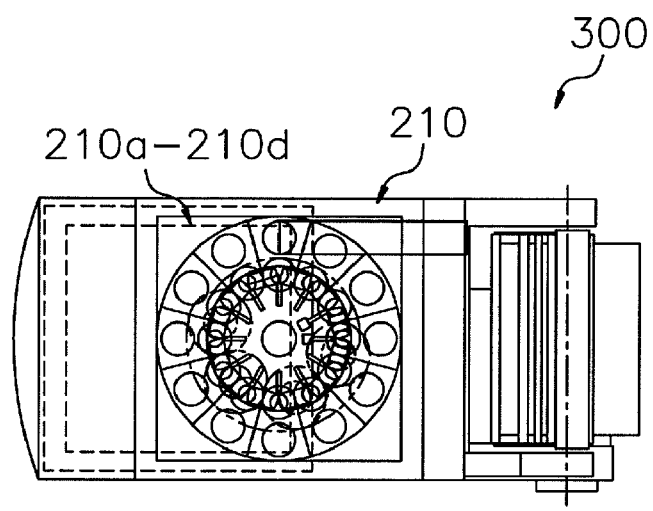
FIG. 18(a) is a top plan view of a bag manufacturing and packaging system provided with a combination weighing system according to yet another embodiment of the present invention.
Figure 18B:
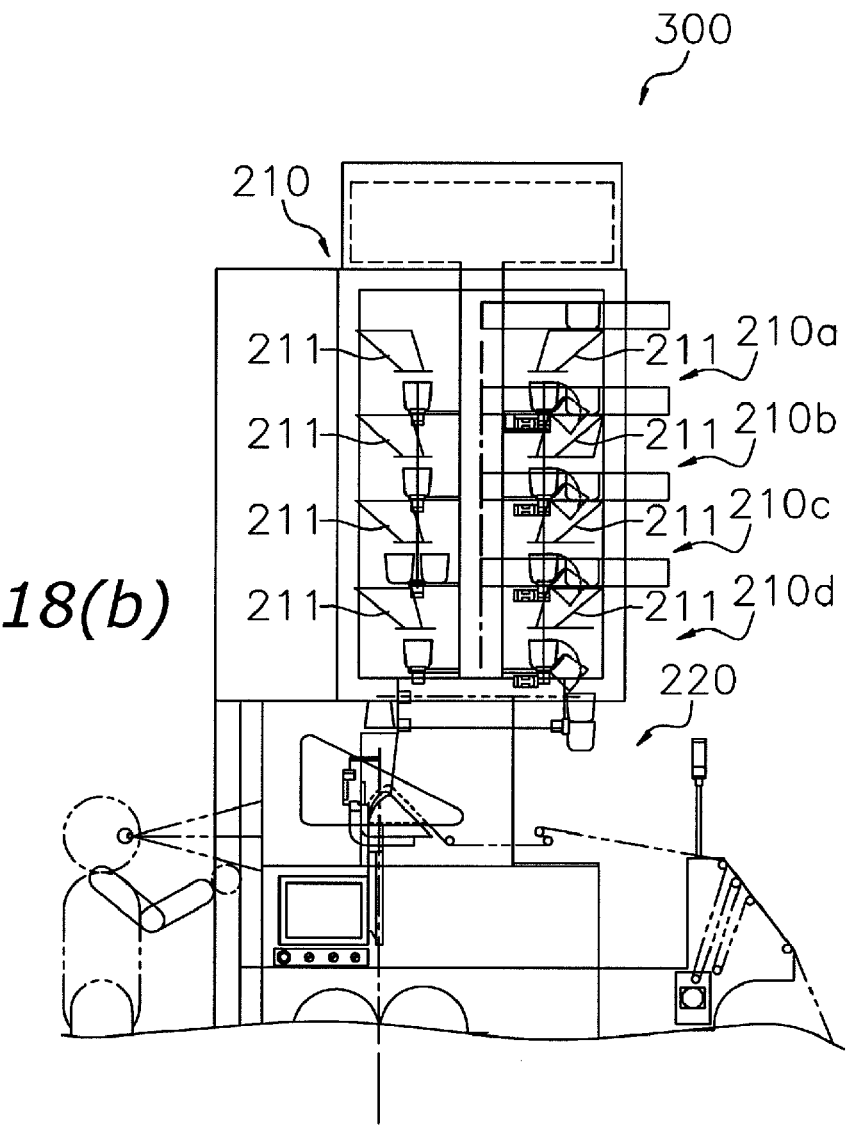
FIG. 18(b) is a side elevational view thereof.

Further, as shown in FIGS. 18(a) and 18(b), a bag manufacturing and packaging system 300 may be provided by including a combination weighing system 210 similar to the above described combination weighing system 200 on the upstream side of a bag manufacturing and packaging apparatus 220.

In this case, it is possible to transfer the articles between the containers C that circulate through each of combination weighing devices 210a to 210d arranged in multiple stages. It is also possible, by discharging the articles into a discharge chute 211 so as to discharge the articles into the combination weighing devices 210a to 210d disposed on the lower stage, to discharge the articles that underwent combination weighing into the bag manufacturing and packaging apparatus 220 disposed on the downstream side.

Note that, as shown in FIG. 18(b) and the like, delivery of the articles between the combination weighing devices 210a and 210d vertically arranged may be performed via the discharge chute 211 or directly between the containers C.

(B) The above embodiment was described using the combination weighing device 10 provided with the weighing unit 13 as shown in FIG. 1 and the like. However, the present invention is not limited thereto.

For example, a combination weighing device may be provided which does not include a weighing device for weighing the articles and which performs combination weighing by using the results of weighing obtained by a weighing device separately disposed on the upstream side.

Also in this case, the same effects as described above can be achieved. Specifically, weighing can be performed while conveying a plurality of containers C, and the articles can be easily discharged by simply vertically inverting containers selected based on the results of combination weighing such that the openings of the containers C face downward, and also the articles selected by combination weighing can be continuously discharged by repeating the rotary movement.

Further, also in this case, the same effects as described above can be achieved. Specifically, a decrease in efficiency of combination weighing because of the increased number of the containers C that cannot participate in combination weighing can be prevented.

(C) With the above embodiment, an example was described in which the combination weighing device of the present invention is used independently. However, the present invention is not limited thereto.

Figure 13:
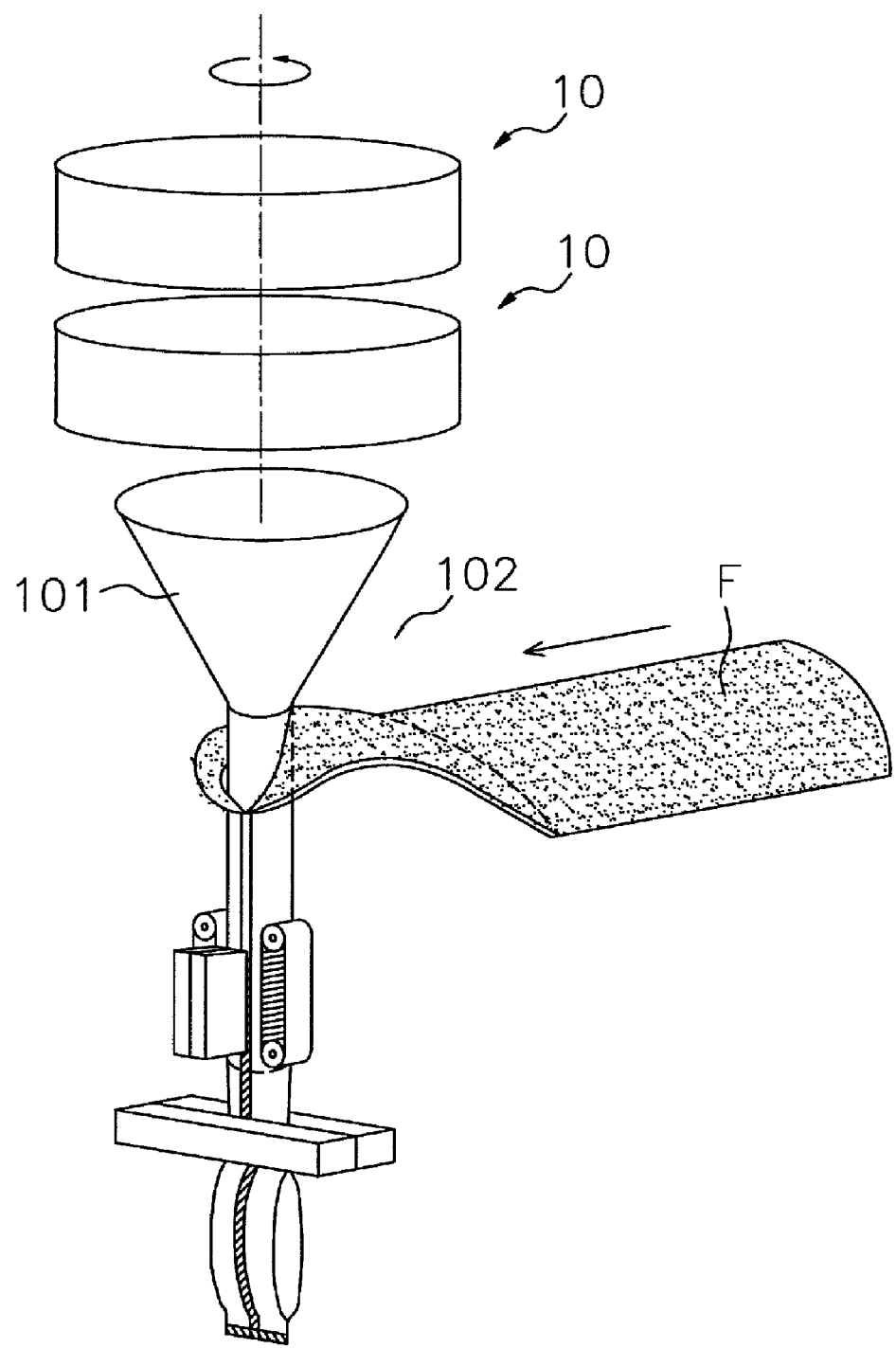
FIG. 13 is a perspective view of the structure of a bag manufacturing and packaging system provided with a combination weighing device according to another embodiment of the present invention.
Figure 14:
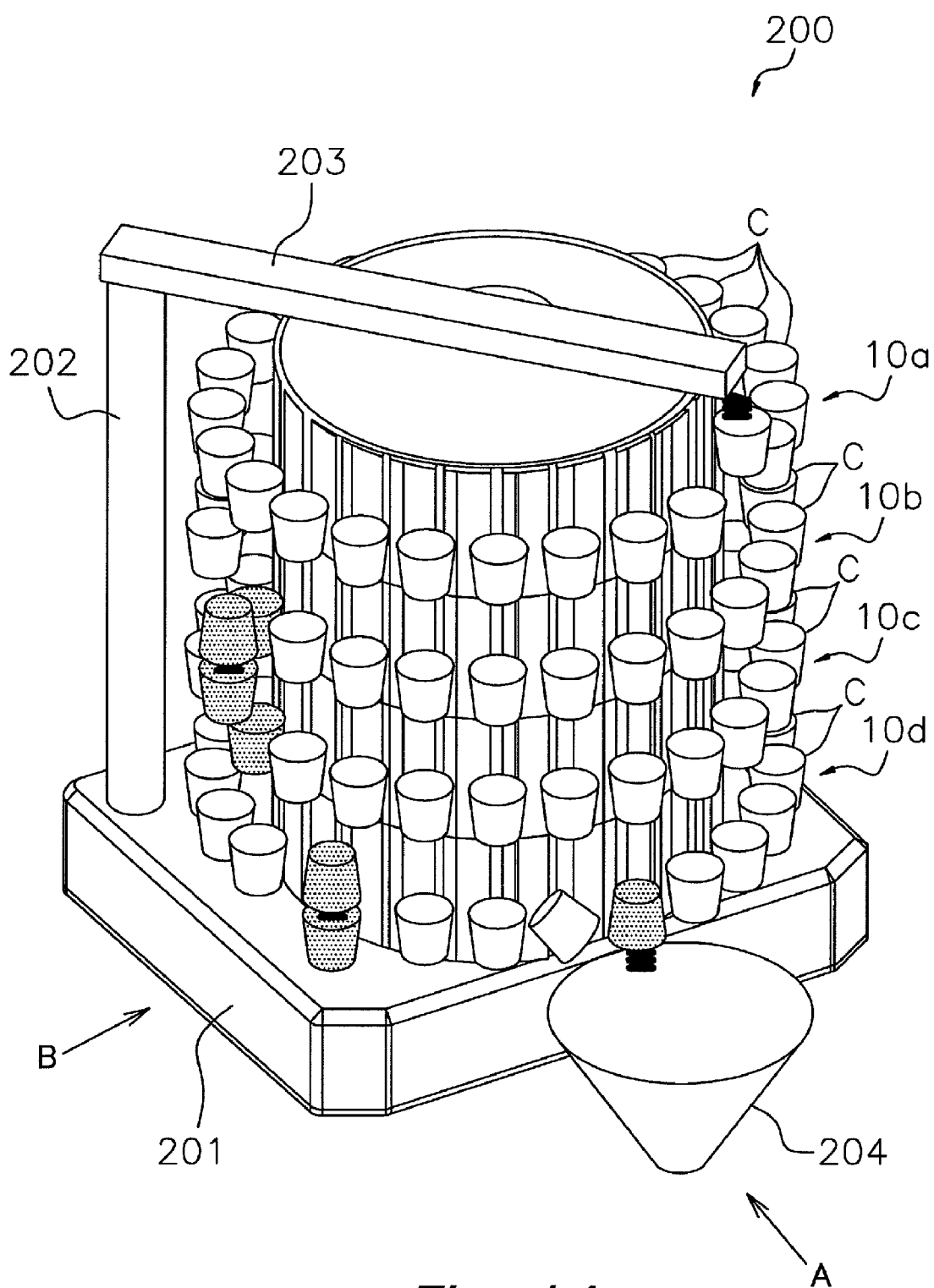
FIG. 14 is a perspective view of a combination weighing system provided with a plurality of combination weighing devices according to yet another embodiment of the present invention.
Figure 15:
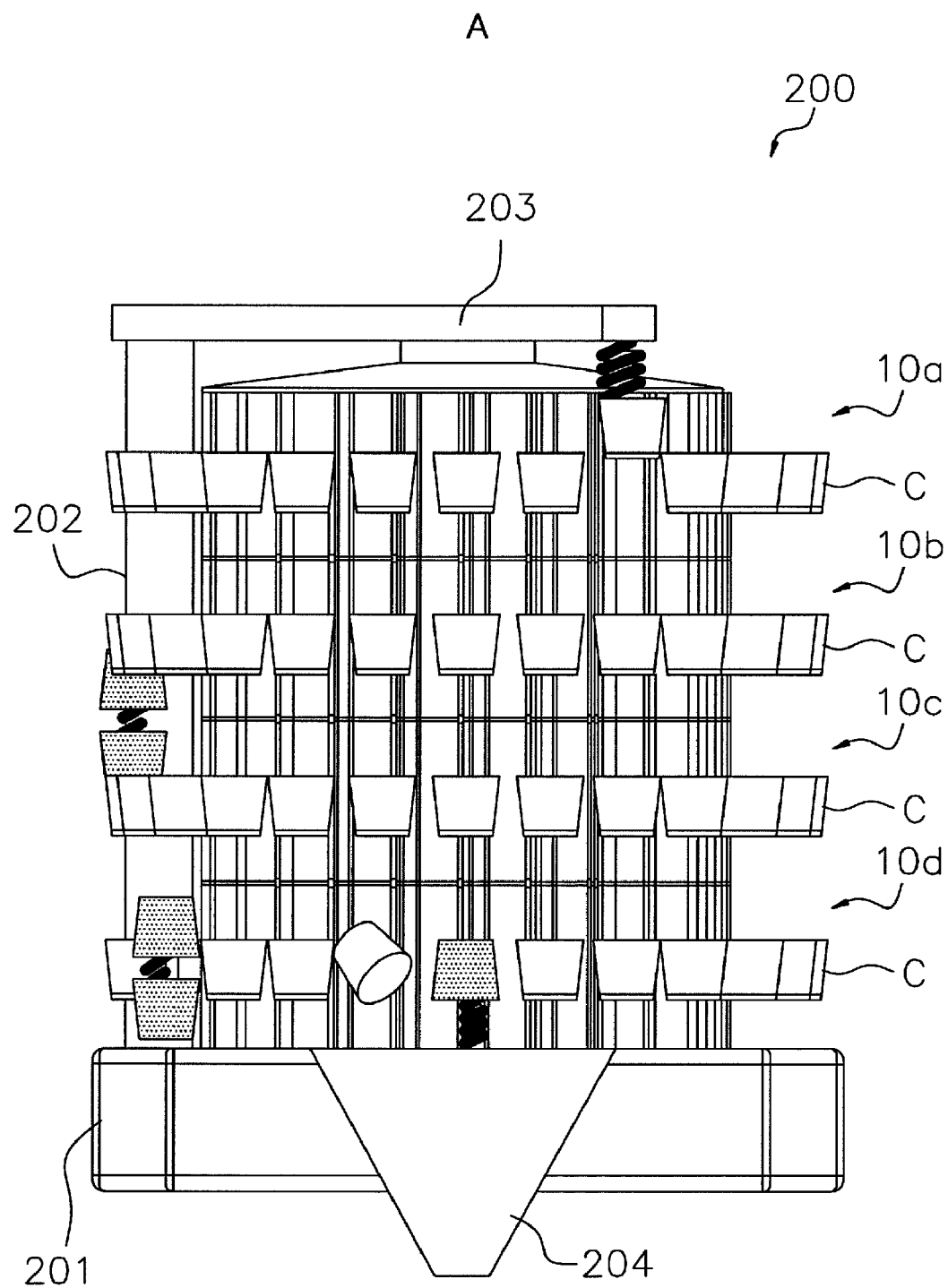
FIG. 15 is an elevation view of the combination weighing system viewed from a direction A shown in FIG. 14.
Figure 16:
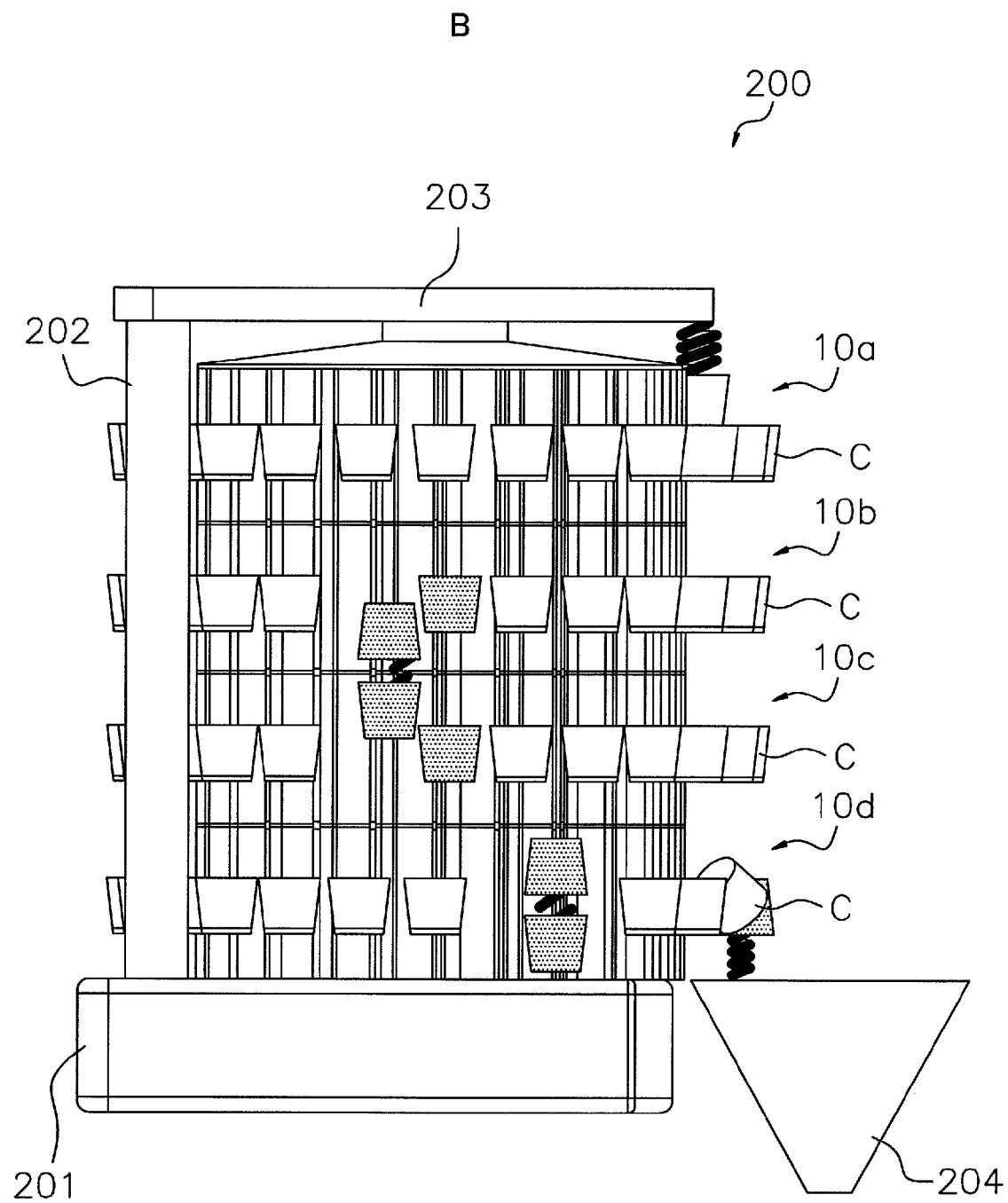
FIG. 16 is a lateral view of the combination weighing system viewed from a direction B shown in FIG. 14.
Figure 17:
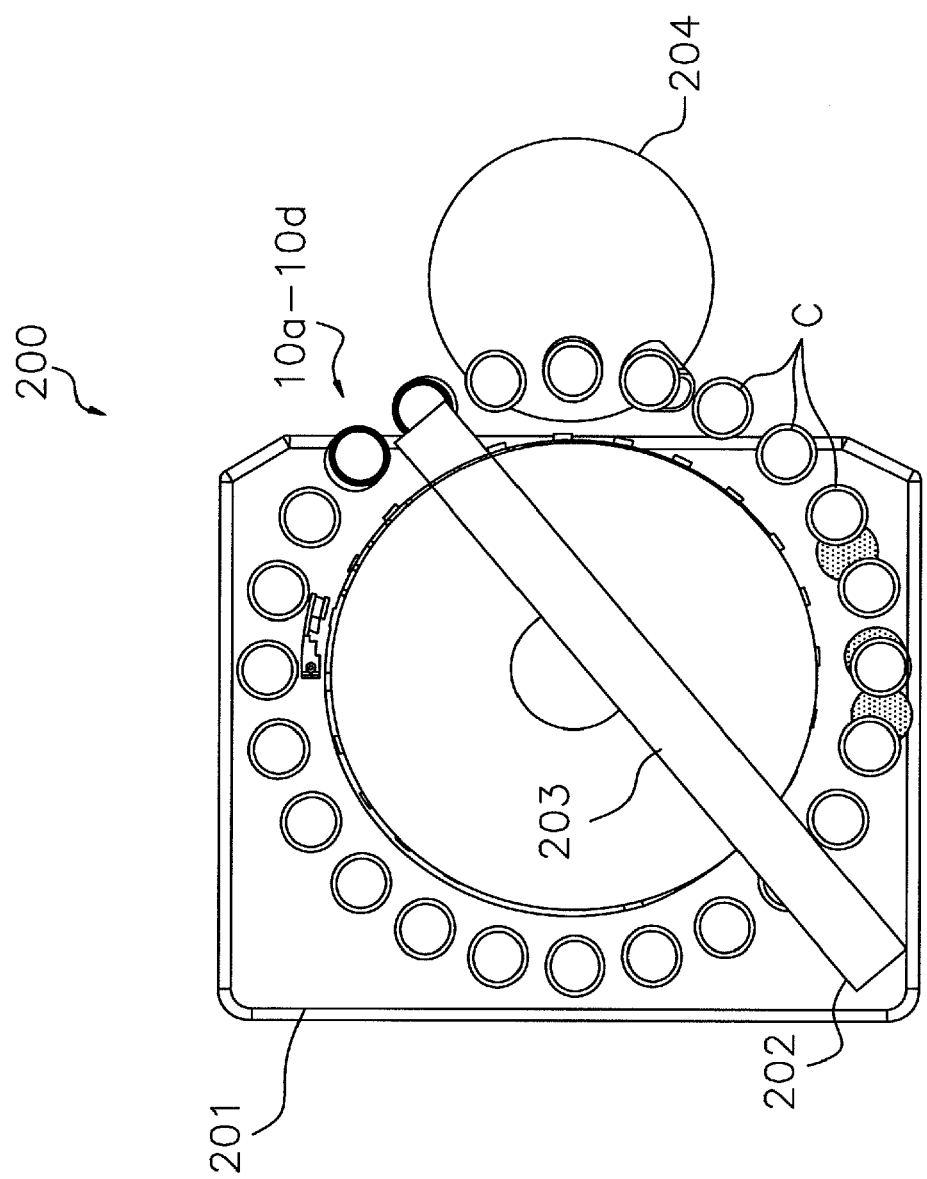
FIG. 17 is a top plan view of the combination weighing system shown in FIG. 14.

For example, as shown in FIG. 13, the combination weighing device of the present invention may be used as a part of a bag manufacturing and packaging system 100 that includes, on the downstream side of the plurality of combination weighing devices 10, a collection chute 101 that collects the discharged articles and a bag manufacturing and packaging apparatus 102 that puts the articles in a bag manufactured by using a film F and packages the same.

Also in this case, the same effects as described above can be achieved. Specifically, it is possible to efficiently perform the operations from weighing to discharging while circularly moving a plurality of containers.

(D) The above embodiment was described using the combination weighing device that circularly moves the container C along a single circulation loop. However, the present invention is not limited thereto.

For example, as shown in FIG. 13, the bag manufacturing and packaging system 100 including the collection chute 101 that collects the discharged articles and the bag manufacturing and packaging apparatus 102 that puts the articles in a bag manufactured by using the film F and packages the same may have a structure in which the combination weighing devices 10 are vertically arranged in multiple stages, and the circulation loops that move the containers C along a substantially horizontal plane as shown in FIG. 1 are vertically superposed in multiple stages.

In this case, the containers C that circularly move along the circulation loop located on the upper stage are vertically inverted above the containers C that circularly move along the circulation loop located on the lower stage. By so doing, the articles can be supplied and distributed and the like from the containers C on the upper stage to the containers C on the lower stage.

In addition, as shown in FIG. 13, when weighing and stocking the articles, changing the order of the containers C, and distributing and discharging the articles and the like are performed by forming a plurality of circulation loops and conveying the containers C therealong, the containers C may be circularly moved at different conveying speeds along the adjacent circulation loops in the same direction.

In this case, it is possible to increase the number of times in which the container C conveyed along the upper circulation loop lies adjacent to the container C conveyed along the lower circulation loop, and thus the operations such as changing the order of the containers C and distributing the articles can be further efficiently performed.

(E) In the above embodiment, with reference to FIGS. 10(a) to 10(d), how the articles are distributed was described for the case when the weights of both the two containers C i.e., the supply container C and the receiving container C selected by the control unit 50, are out of the above-described predetermined weight range. However, the present invention is not limited thereto.

For example, it may be that the weight of the articles stored in one of either containers C is out of the above-described predetermined weight range and the weight of the articles stored in the other container C is in the above-described predetermined weight range.

For example, when the weight of the articles in the supply container C is out of the above-described predetermined weight range, the degree of tilt of the container C is controlled, in view of the weight of the articles stored in the receiving container C, so that the amount of articles to be supplied is prevented from exceeding the above described predetermined weight range.

Accordingly, even when combination weighing is performed using the articles in the above described predetermined weight range and the articles out of the above described predetermined weight range, both articles can be made to be in the predetermined weight range.

(F) In the above embodiment, an example was described in which the containers C are delivered and received via the support mechanism 24, instead of directly delivering and receiving the containers C between the container arrangement mechanisms 20. However, the present invention is not limited thereto.

For example, the containers may be directly delivered and received between the container arrangement mechanisms without involving the support mechanism. Also in this case, a similar effect as described above can be attained. Specifically, the articles are efficiently discharged by the combination weighing device.

(G) In the above embodiment, an example was described in which the operations such as changing the order of the containers C and distributing and discharging the articles are performed while circularly moving the containers C. However, the present invention is not limited thereto.

For example, a structure may be employed in which, while the containers C are being conveyed by a conveying unit that linearly conveys the containers C, the order of the containers C is changed by a container arrangement mechanism having a similar structure as described in the above embodiment.

(H) In the above embodiment, an example was described in which the container arrangement mechanism 20 changes the order of two mutually adjacent containers C and distributes the articles. However, the present invention is not limited thereto.

For example, a structure may be employed in which the order of two containers that are disposed so as to sandwich one container is changed. However, in this case, the control to change the order of a plurality of containers into a desired order will become complicated. Therefore, in view of simplifying the control, it is more preferable that the present invention employs a structure in which the order of two adjacent containers is changed as described in the above embodiment.

(I) In the above embodiment, an example was described in which the container arrangement mechanism 20 changes the order of two adjacent containers and distributes the articles. However, the present invention is not limited thereto.

For example, a container arrangement mechanism that changes the order of four adjacent containers may be employed. However, in this case as well, the control to change the order of a plurality of containers into a desired order will become complicated. Therefore, in view of simplifying the control, it is more preferable that the present invention employs a mechanism that changes the order of two containers as described in the above embodiment.

(J) In the above embodiment, an example was described in which the container arrangement mechanism 20 that changes the order of the containers C during conveyance moves together with the rotor 11 (container C) along the container C circulation path. However, the present invention is not limited thereto.

For example, when the containers are intermittently moved, the container arrangement mechanism may be fixedly disposed at a predetermined position on a side of the container conveying path. In this case, the order changing mechanism may be configured to come in contact with the intermittently moving containers and hold the same before they stop moving and then change the order of these containers.

The combination weighing device of the present invention is configured and arranged to improve the efficiency of combination weighing by reducing the number of containers C that cannot participate in combination weighing and is also capable of improving the efficiency of the process by completing the discharge of articles that participated in combination weighing by discharging the articles from a certain container into the packaging machine and the like disposed downstream. Since the combination weighing device provides the above described effects, it is widely applicable to various devices that perform processes by using containers.

The invention claimed is:

1. A combination weighing device comprising:
   a conveying unit configured to convey in the same plane a plurality of containers into which articles to be weighed are fed;
   a rotation mechanism configured to rotate the orientation of at least one of the containers with respect to a vertical direction and supply the articles fed in the one of containers to an adjacent one of the containers; and
   a control unit configured to select the one of the containers to be rotated by the rotation mechanism based on the weight of the articles in the one of the containers and to control the rotation of the one of the containers by the rotation mechanism.

2. The combination weighing device according to claim 1, wherein
   the control unit is configured to control the rotation mechanism so as to collect the articles contained in selected containers among the plurality of containers into a prescribed one of the plurality of the containers.

3. The combination weighing device according to claim 1, further comprising
   an order changing mechanism configured to change the order of the plurality of containers conveyed by the conveying unit.

4. The combination weighing device according to claim 1, wherein
   the conveying unit is configured to circulate the containers along a circulation path.

5. The combination weighing device according to claim 4, wherein
   the conveying unit is further configured to circulate the containers along the circulation path including a plurality of circulation loops.

6. The combination weighing device according to claim 5, wherein
   the conveying unit is configured to circulate the containers in the plurality of the circulation loops at different conveying speeds.

7. The combination weighing device according to claim 5, wherein
   the plurality of the circulation loops are vertically juxtaposed.

8. A combination weighing device comprising:
   a conveying unit configured to convey a plurality of containers into which articles to be weighed are fed;
   a distribution mechanism configured to tilt the orientation of one of the containers to distribute at least a portion of the articles in the one of the containers to a different container among the plurality of the containers; and
   a control unit configured to select a the one of the containers whose orientation is to be tilted based on the weight of the articles in the one of the containers.

9. The combination weighing device according to claim 8, wherein
the control unit is configured to determine a target container containing the articles having the weight that is out of a predetermined range, and to control the distribution mechanism such that the articles are distributed from is the target container.

10. The combination weighing device according to claim 8, further comprising
an order changing mechanism configured to move at least one of the containers to change the order of the containers.

11. The combination weighing device according to claim 10, wherein
the order changing mechanism is configured to move the containers in a substantially vertical plane.

12. The combination weighing device according to claim 8, wherein
the conveying unit is configured to move the plurality of containers along a circulation path.

13. The combination weighing device according to claim 8, wherein
the control unit is configured to control the distribution mechanism to adjust a tilting degree of the one of the containers at the time of distribution of the articles according to the weight of the articles contained in the one of the containers to be distributed.

14. The combination weighing device according to claim 8, wherein
the distribution mechanism is configured to distribute the articles to be distributed to the different container by moving the articles substantially in a vertical plane.

15. A bag manufacturing and packaging system comprising:
the combination weighing device according to claim 1;
a collection chute disposed below a container circulation path formed by the conveying unit and configured to collect the articles discharged from the containers; and
a packaging unit configured to package the articles discharged into the collection chute.

16. The bag manufacturing and packaging system according to claim 15, further comprising
at least one additional combination weighing device vertically arranged with respect to the combination weighing device so that the articles are vertically delivered between the combination weighing device and the additional combination weighing device.

17. A combination weighing system comprising:
a plurality of the combination weighing devices according to claim 1 vertically arranged in a plurality of stages so that the articles are vertically delivered between the combination weighing devices.

* * * * *